Figure 55:
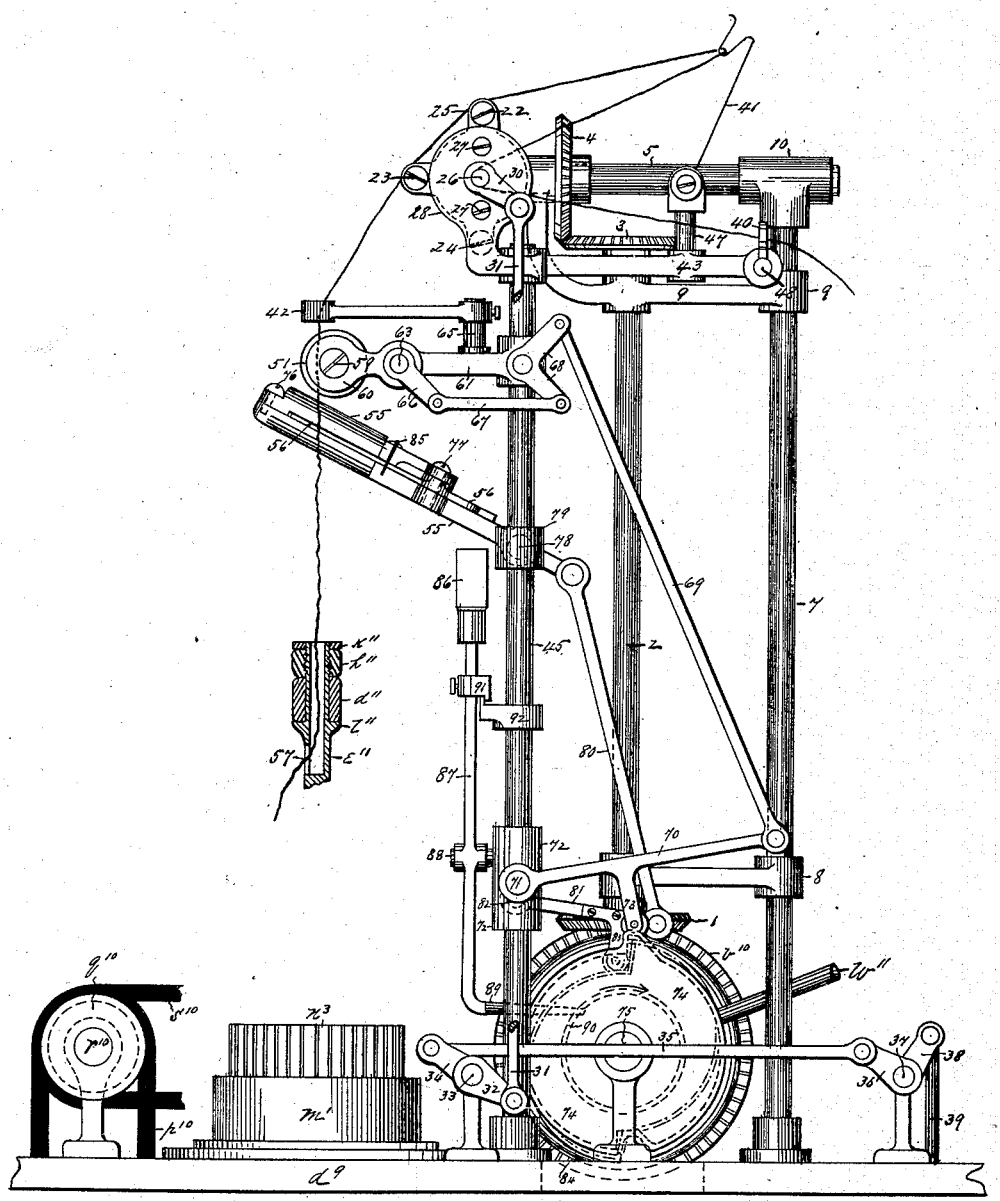

(No Model.) 13 Sheets—Sheet 1.
W. L. & A. T. CATHCART.
CIRCULAR KNITTING MACHINE.
No. 410,071. Patented Aug. 27, 1889.
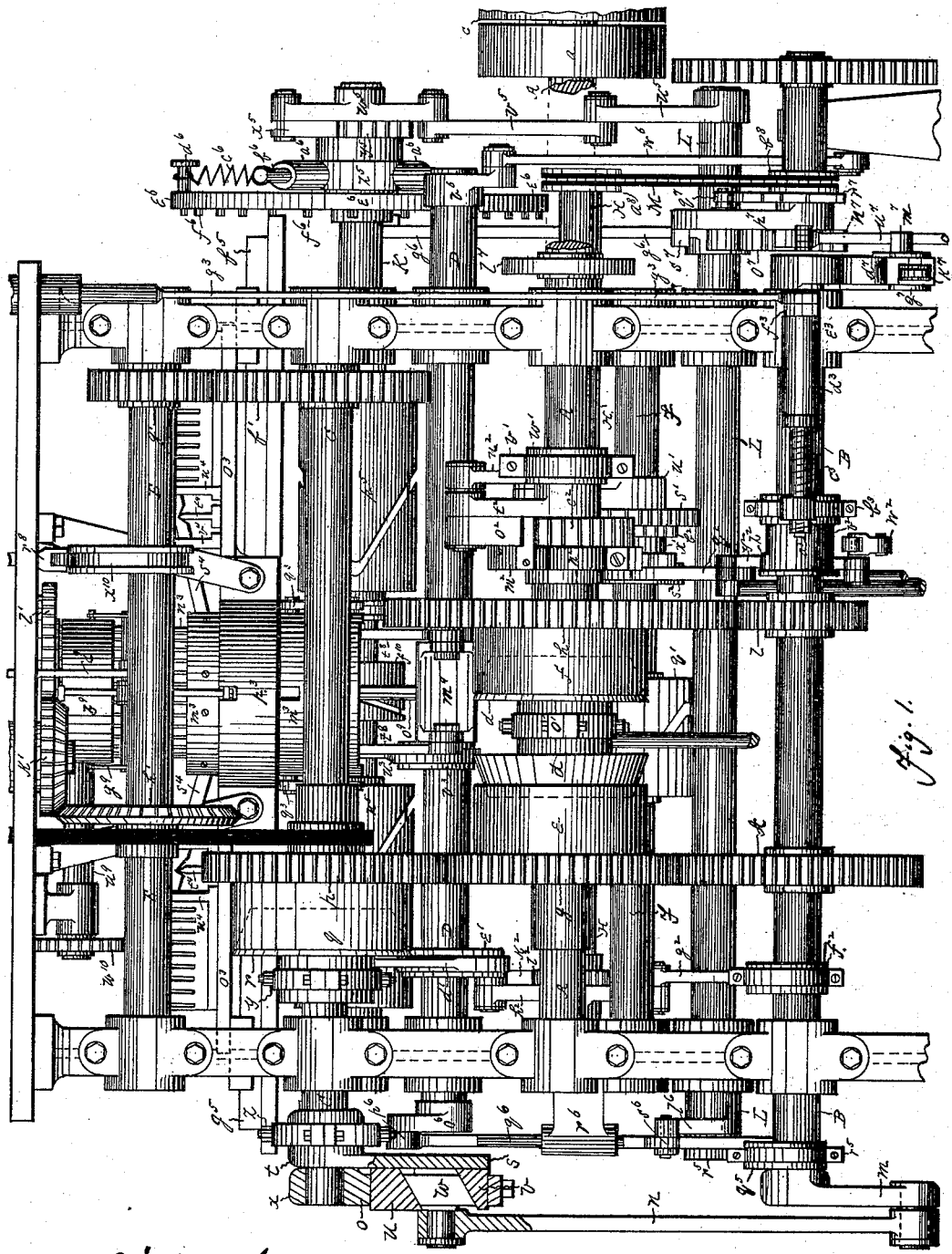

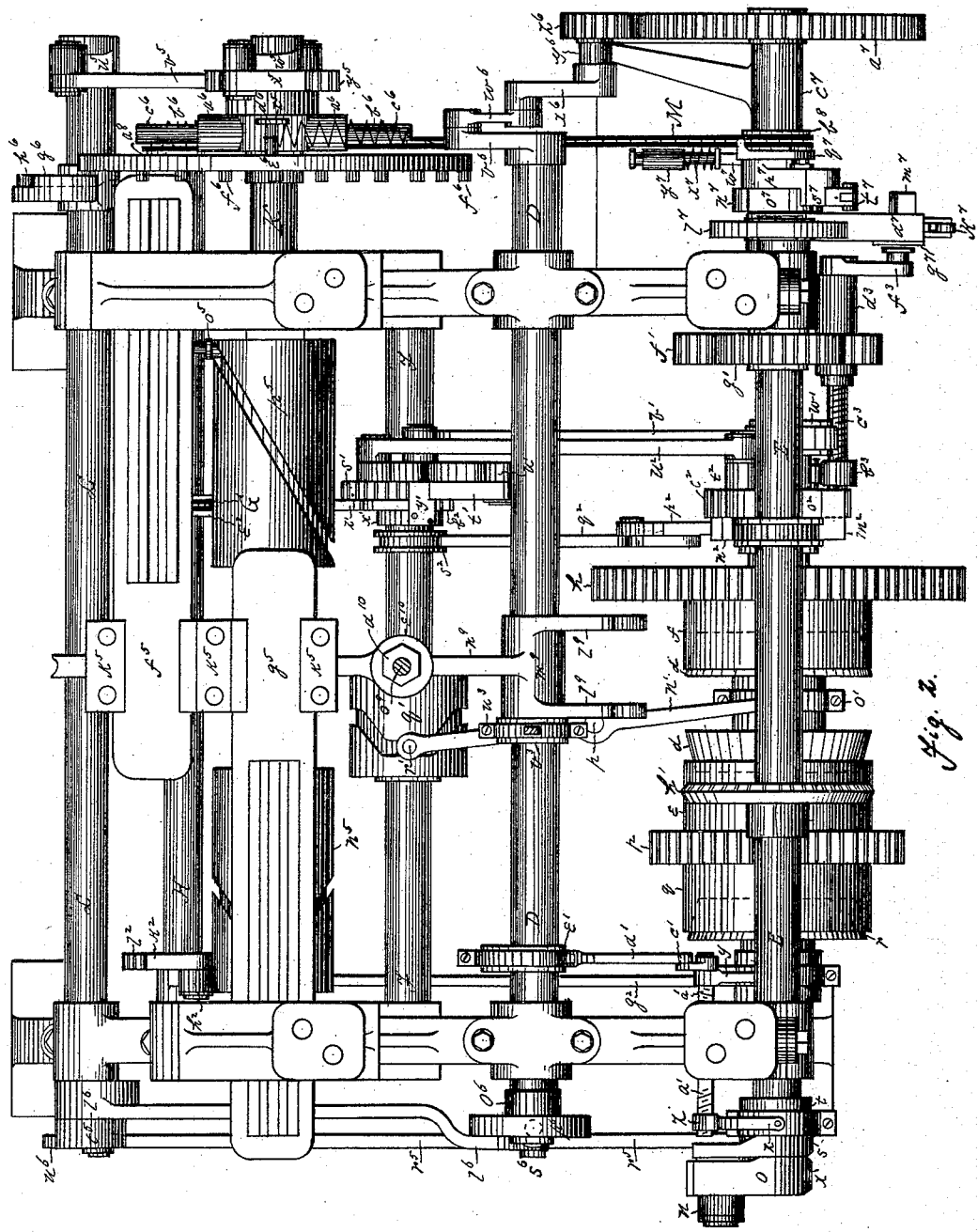

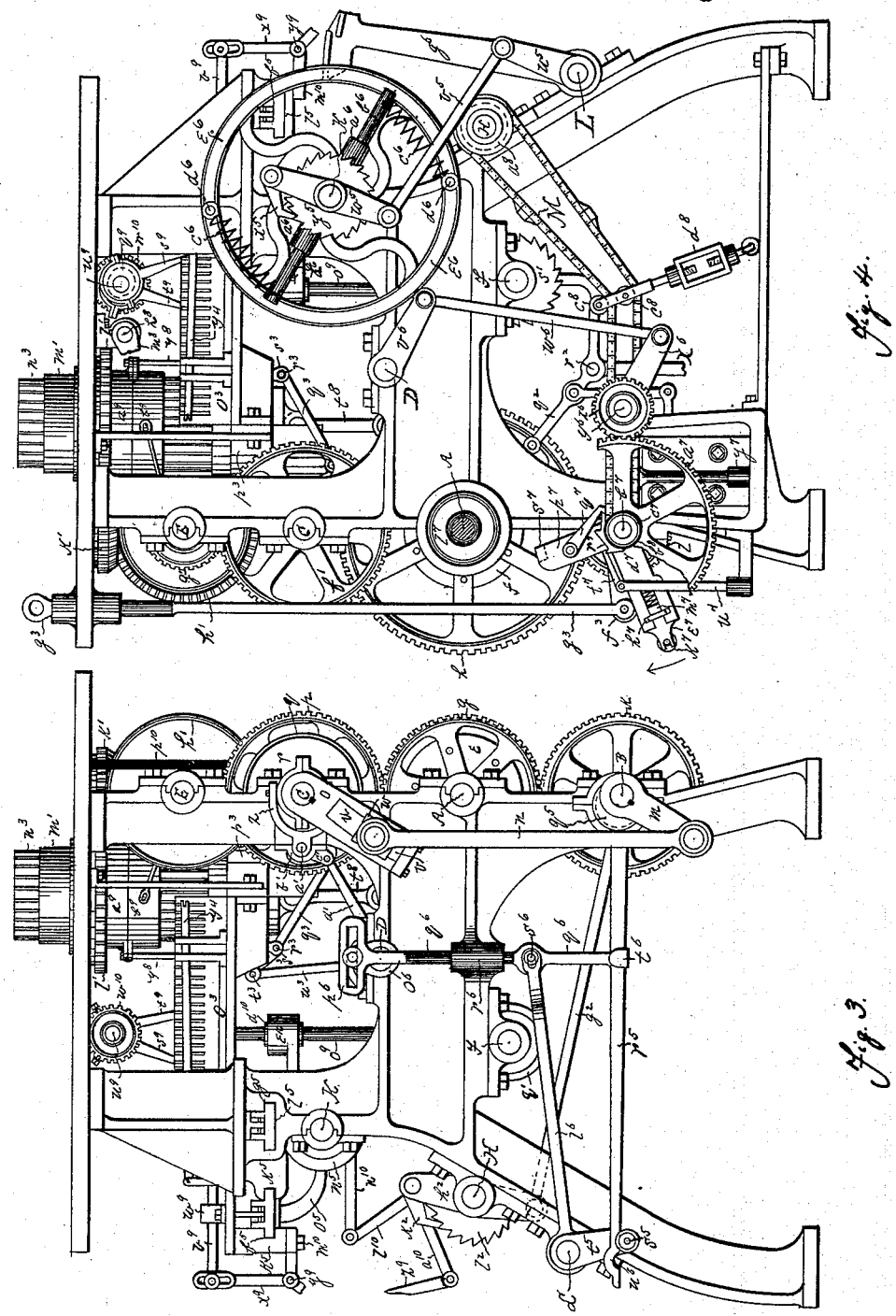

(No Model.) 13 Sheets—Sheet 4.
W. L. & A. T. CATHCART.
CIRCULAR KNITTING MACHINE.
No. 410,071. Patented Aug. 27, 1889.
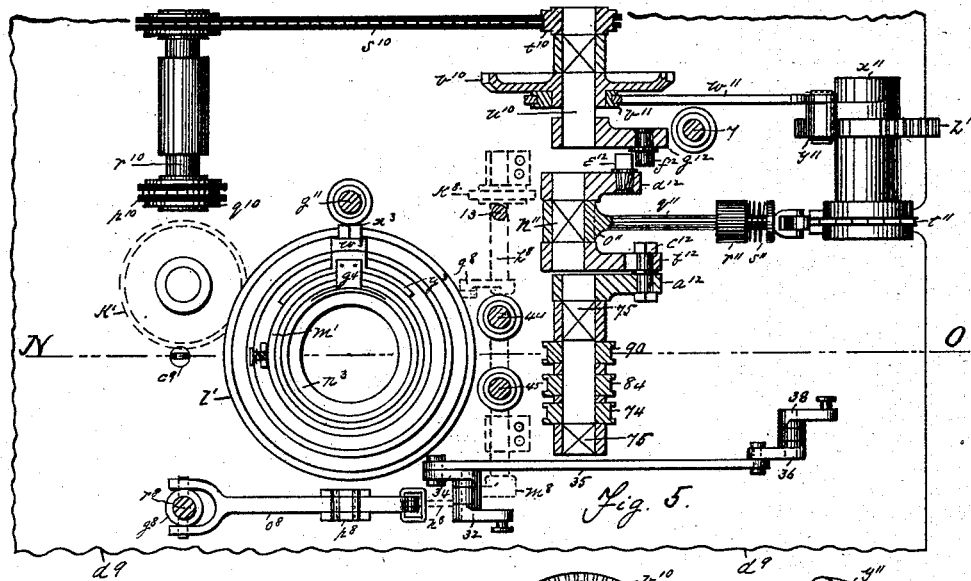
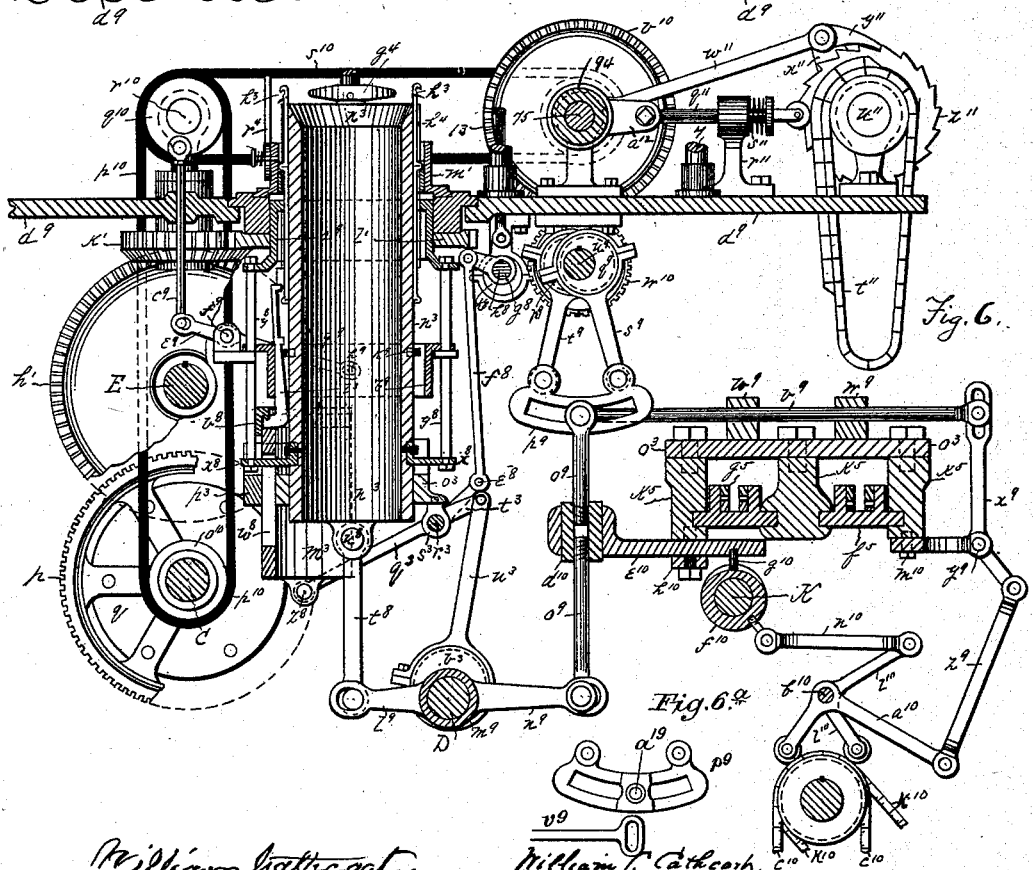

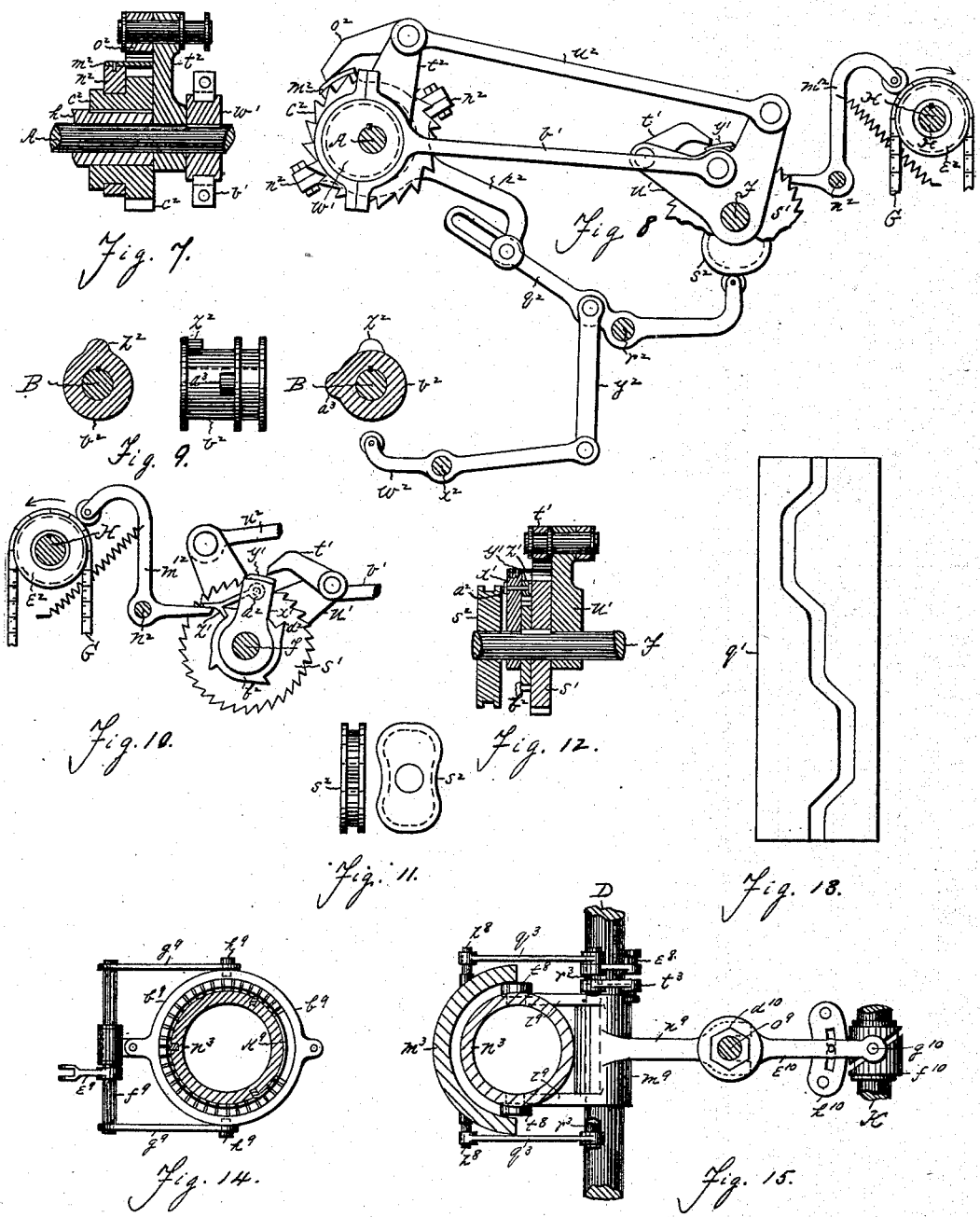

(No Model.)  
13 Sheets—Sheet 6.
W. L. & A. T. CATHCART.
CIRCULAR KNITTING MACHINE.
No. 410,071. Patented Aug. 27, 1889.
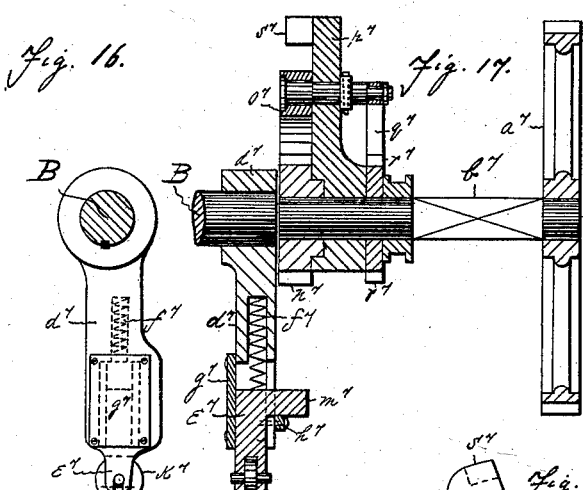
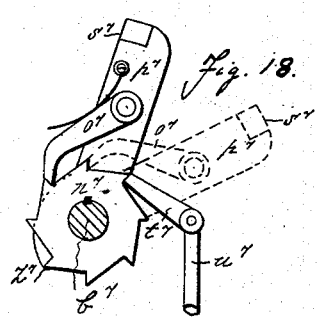
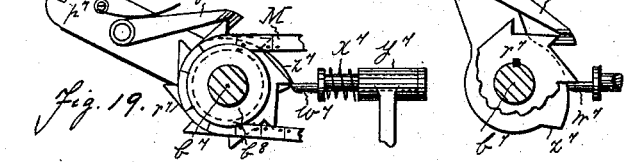
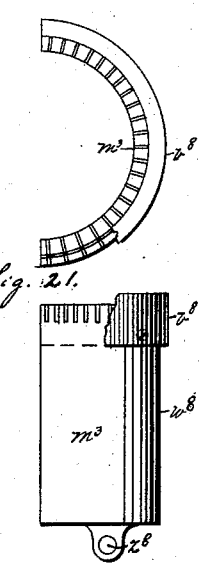
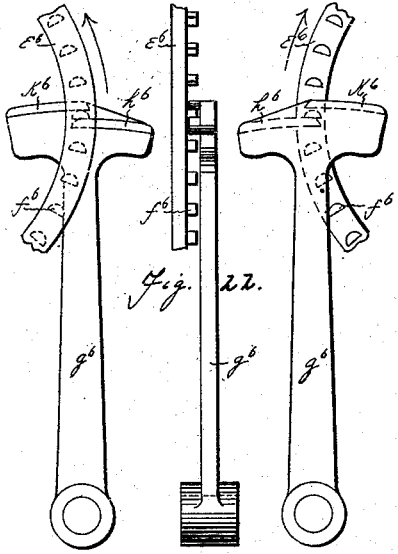
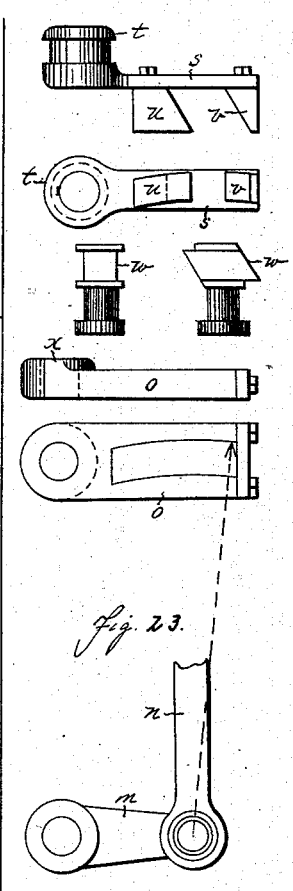

(No Model.)  13 Sheets—Sheet 7.
W. L. & A. T. CATHCART.
CIRCULAR KNITTING MACHINE.
No. 410,071. Patented Aug. 27, 1889.
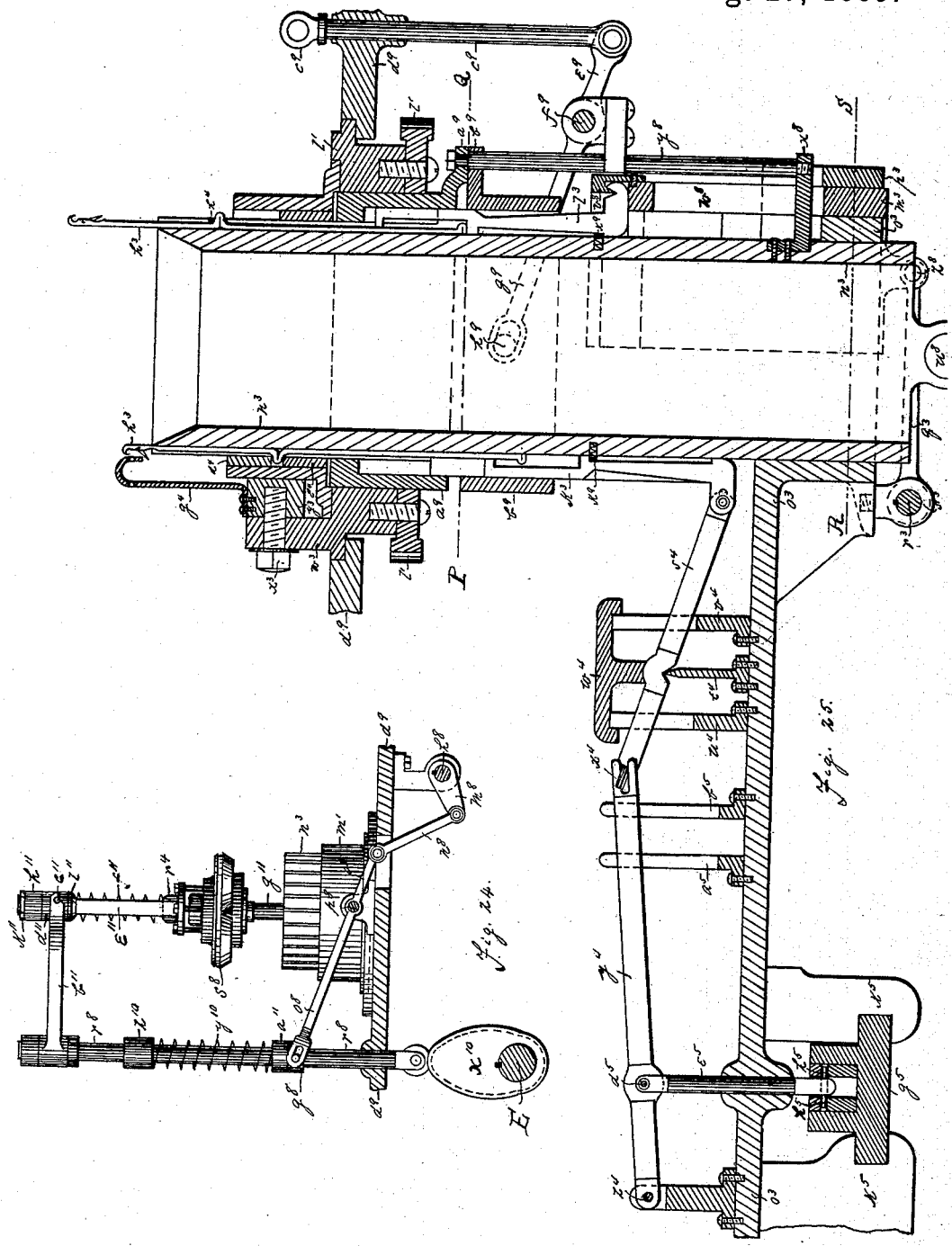
Witnesses:
Inventors:— William L. Cathcart, Alexander T. Cathcart.

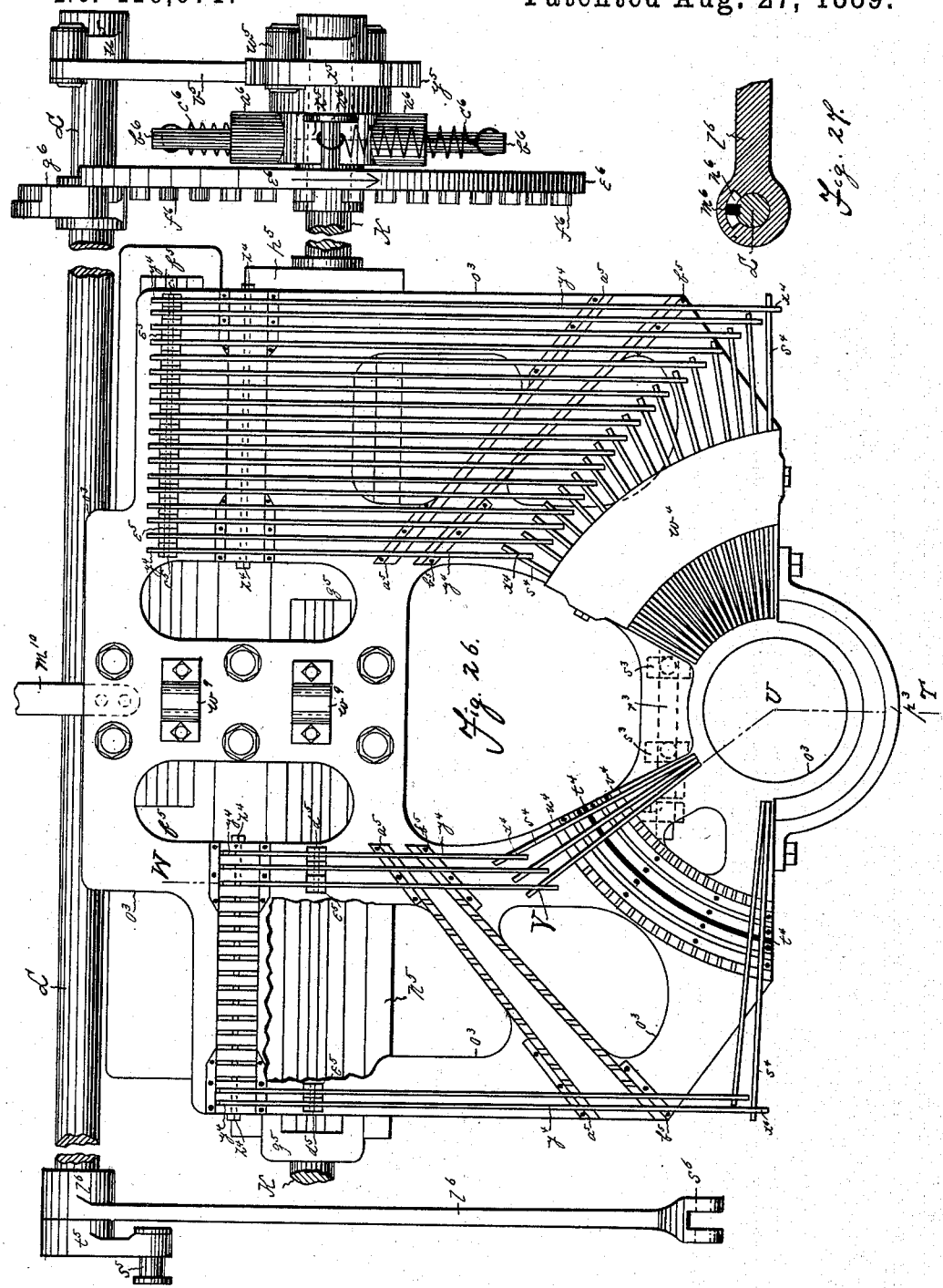

(No Model.) 13 Sheets—Sheet 9.
W. L. & A. T. CATHCART.
CIRCULAR KNITTING MACHINE.
No. 410,071. Patented Aug. 27, 1889.
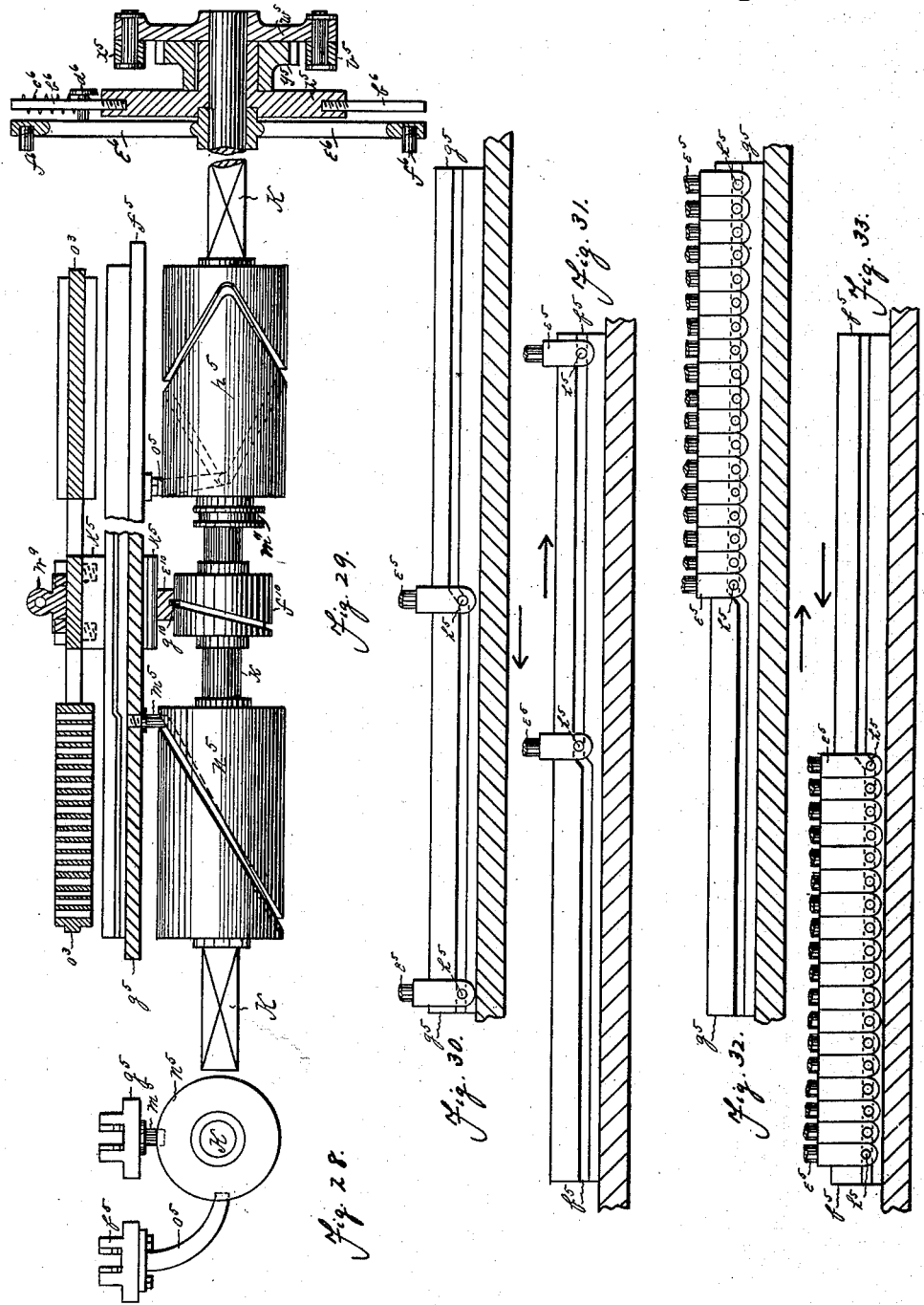

(No Model.) 13 Sheets—Sheet 10.
W. L. & A. T. CATHCART.
CIRCULAR KNITTING MACHINE.
No. 410,071. Patented Aug. 27, 1889.
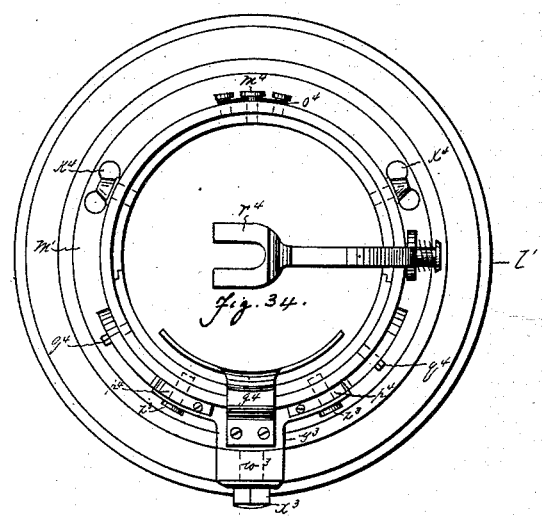
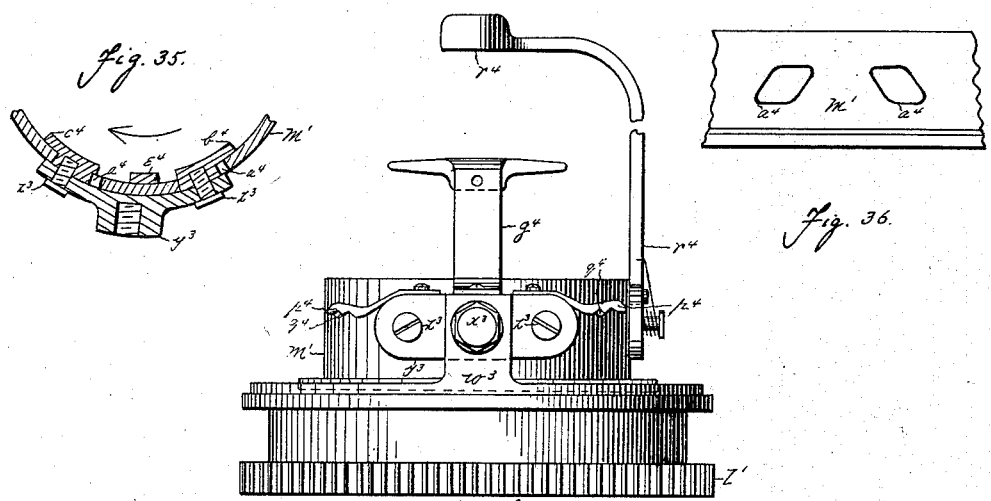
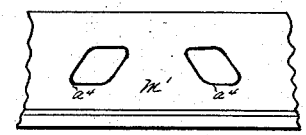
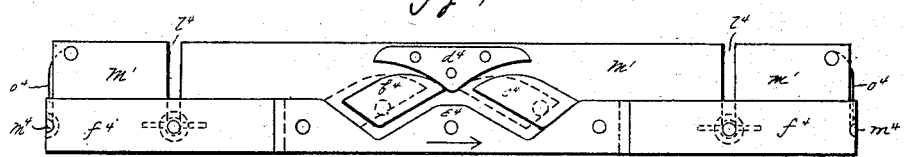
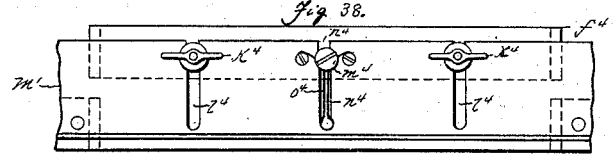

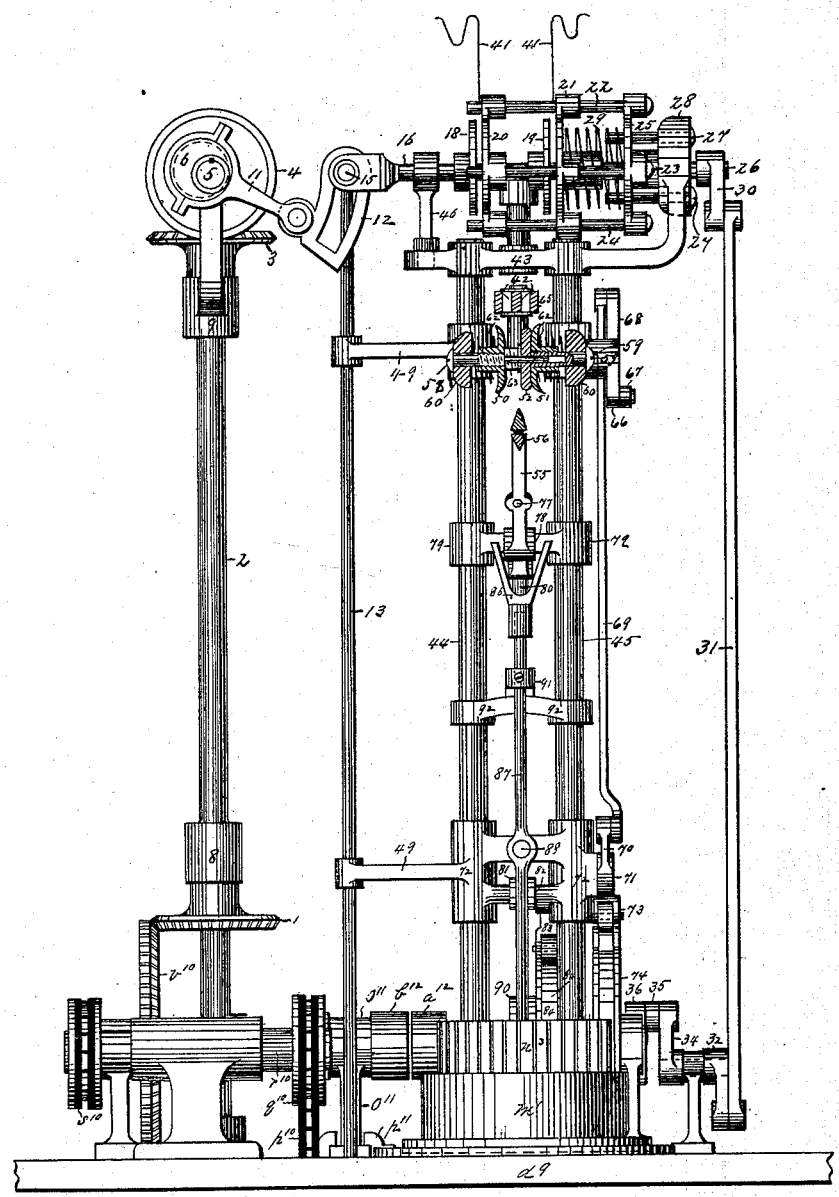

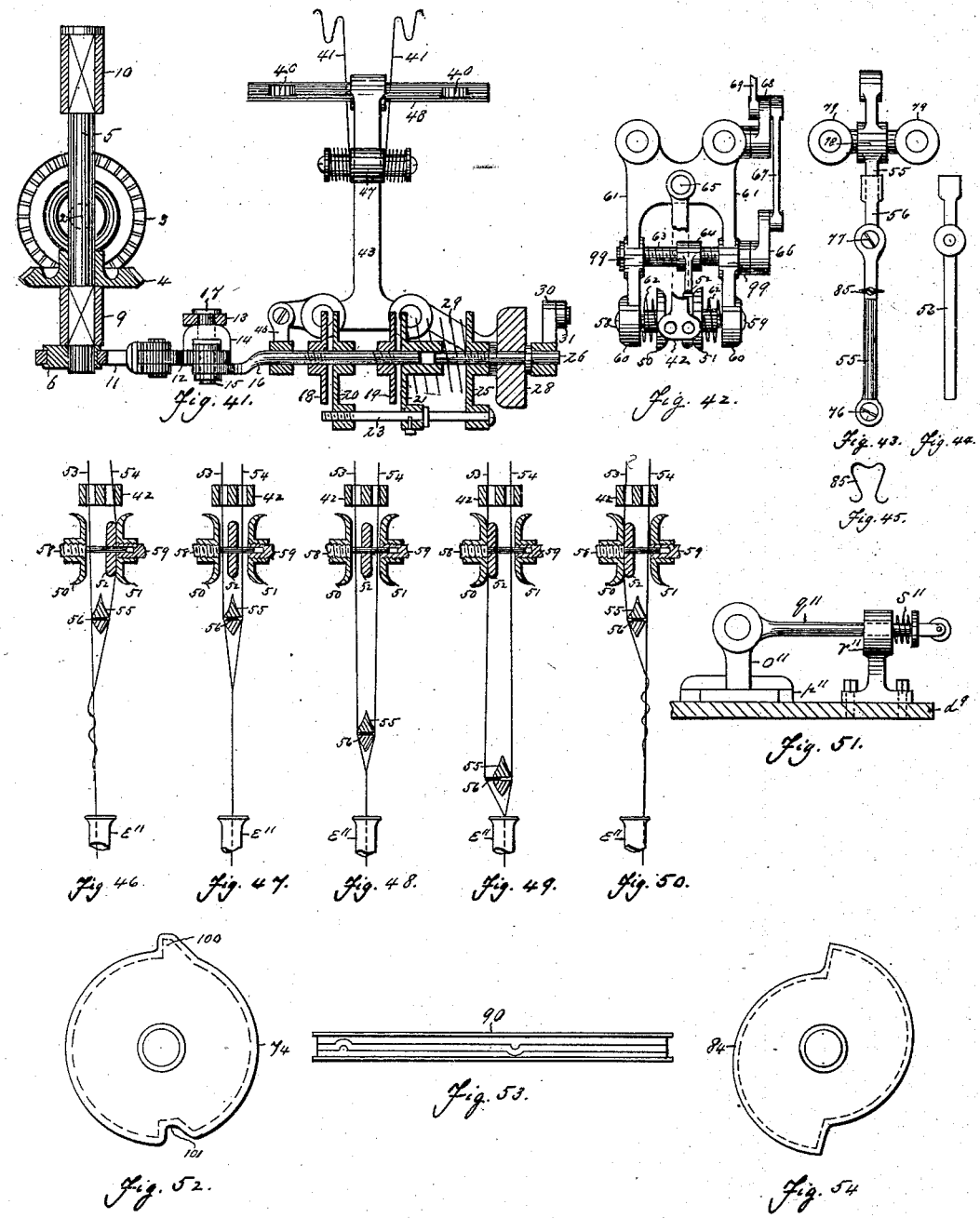

(No Model.) 13 Sheets—Sheet 13.

W. L. & A. T. CATHCART.
CIRCULAR KNITTING MACHINE.

No. 410,071. Patented Aug. 27, 1889.

Witnesses:
Inventors: William L. Cathcart, Alexander T. Cathcart

N. PETERS, Photo-Lithographer, Washington, D. C.

UNITED STATES PATENT OFFICE.

WILLIAM L. CATHCART AND ALEXANDER T. CATHCART, OF GWYNEDD, PENNSYLVANIA.

CIRCULAR-KNITTING MACHINE.

SPECIFICATION forming part of Letters Patent No. 410,071, dated August 27, 1889.

Application filed September 20, 1888. Serial No. 285,950. (No model.)

*To all whom it may concern:*

Be it known that we, WILLIAM L. CATHCART and ALEXANDER T. CATHCART, citizens of the United States, residing at Gwynedd, in the county of Montgomery and State of Pennsylvania, have invented certain new and useful Improvements in Circular-Knitting Machines; and we do hereby declare the following to be a full, clear, and exact description of the invention, such as will enable others skilled in the art to which it appertains to make and use the same.

This invention relates to knitting-machines, and, as set forth in this specification, is an improvement upon the machine for which application for Letters Patent of the United States was filed by William Cathcart, of Gwynedd, Montgomery county, Pennsylvania, as administrator of the estate of Gilbert J. Cathcart, deceased, and by William L. Cathcart, then of Philadelphia, Philadelphia county, Pennsylvania, on the 3d day of February, 1888, Serial No. 262,911, upon which application Letters Patent No. 395,214 were granted December 25, 1888, to which reference may be had.

The present invention consists in additions, modifications, and in details of construction which will be hereinafter fully described, and pointed out in the claims.

In the accompanying drawings, which illustrate our invention and form a part of this specification, Figure 1 represents in front elevation, partly sectional, all parts of the machine below the table, the lower portion of the framing being broken away. Fig. 2 is a top plan of all that part of the machine below the table, except the lever-bed, the needle-cylinder, and the parts connected to them. Fig. 3 is a left-hand end elevation of the machine, viewing the machine as in Fig. 1, omitting all parts above the table except the needle and cam cylinders. Fig. 4 is a right-hand end elevation of the machine, viewing the machine as in Fig. 1, omitting all parts above the table except the needle and cam cylinders. Fig. 5 is a top plan, partly sectional, of the parts above the table, all except the actuating mechanism being omitted. Fig. 6 is a vertical section of a portion of the machine on line N O, Fig. 5. Fig. 6$^a$ shows in left-hand side elevation the link $p^9$, shown in right-hand side elevation in Fig. 6. Fig. 7 is a vertical section of the auxiliary driving-gear employed to revolve the cam-cylinder at a low rate of speed. Fig. 8 is a right-hand end elevation, partly sectional, of Fig. 7, including, also, the driving-gear for shifting the main friction-cones, the connected parts, and the means of controlling the action of both gears. Fig. 9 shows in front elevation and vertical section the adjusting-cam $v^2$, employed to stop the cam-cylinder at the proper places for raising (one-half at a time) the needles. Fig. 10 is a left-hand end elevation, partly in section, of the driving-gear for shifting the main friction-cones, with the mechanism for controlling its action. Fig. 11 represents front and side elevations of the cam $s^2$, employed to control the tripping-gear of the auxiliary driving mechanism. Fig. 12 is a vertical section of the driving-gear for shifting the main friction-cones and of cam $s^2$. Fig. 13 is a development of the cylindrical cam $q'$, by the rotation of which the main friction-cones are shifted. Fig. 14 is a horizontal section through the needle-cylinder $n^3$ on the line P Q, Fig. 25, showing a top plan of the guard-band $b^9$ and the devices for raising and lowering it. Fig. 15 is a horizontal section through the needle-cylinder and jack-holder on the line R S, Fig. 25, showing also in top plan the means for reciprocating the jack-holder and needle-cylinder. Fig. 16 is a left-hand end elevation of the variable arm $d^7$, used to give motion at the proper time to the change-shaft D, to which are attached the various mechanisms which are operative only during reciprocating knitting. Fig. 17 is a vertical section of the variable arm $d^7$ and of the mechanism on the auxiliary shaft $b^7$, by whose intermittent rotation the change-shaft D is moved. Fig. 18 is a left-hand end elevation of the driving-arm $p^7$ of shaft $b^7$ and of other portions of the mechanism on the said shaft. Fig. 19 is a right-hand end elevation of the driving-arm $p^7$ when in position for engagement with the arm $d^7$, and of a portion of the devices for locking and for throwing into and out of action the said arm $p^7$. Fig. 20 is a right-hand end elevation of the arm $p^7$ when said arm is out of action, and of a portion of the parts for locking and for throwing the said arm into and out of action. Fig. 21 represents the jack-holder $m^3$ in side elevation and top plan. Fig. 22 represents the escapement-lever $g^6$ and a portion of the escapement-wheel $E^6$ in right-hand, left-hand, and rear elevations. Fig. 23 represents in left-hand end elevation the lower crank $m$ and portions of the connecting-rod $n$ and expanding-crank $o$, showing the method by which the slot in said crank or arm $o$ is described, with also a top plan of the expanding-crank $o$, a left-hand end elevation and top plan of the secondary crank $s$ and the lugs thereto bolted, and a top plan and side elevation of the crank-pin block $w$. Fig. 24 is a right-hand end elevation of the needle and cam cylinders, the web-holder, and the mechanism for actuating and for throwing into and out of action the web-holder. Fig. 25 is a vertical section on the irregular line T U V W, Fig. 26, of the lever-bed, levers, and cam-bar $g^5$, the bar $g^5$ being, however, shown in the position for tubular knitting, and not at the inside limit of its reciprocation, as in Fig. 26. The figure also shows a vertical section of the needle and cam cylinders and their connected parts in the direction of the line T U V, Fig. 26. Fig. 26 is a top plan of the levers, lever-bed, the cam-bars and their actuating mechanism, and the escapement device for controlling the action of the said actuating mechanism. Fig. 27 is a vertical section through the hub of the lever $l^6$ and shaft L, said lever being used to lock the shaft L when it is desired to throw the escapement mechanism out of action. Fig. 28 is a left-hand end elevation of the cam-bars and their actuating-cams. Fig. 29 is a front elevation, partly in section, of the lever-bed, the cam-bars and their actuating-cams, and a portion of the escapement mechanism. Figs. 30 to 33, inclusive, are vertical sections through the centers of the cam-bars, showing the action of said bars at different positions of their reciprocation. A portion of the lifting-pins is omitted in Figs. 30 and 31. Fig. 34 is a top plan of the cam-cylinder and the annular spur-gear for driving it, with all attachments. Fig. 35 is a horizontal section through the cam-yoke and a portion of the cam-cylinder and the needle-actuating cams. Fig. 36 is a development of a portion of the exterior of the cam-cylinder, showing the apertures through which the switch-cams are operated. Fig. 37 is a front elevation of the cam-cylinder and the annular gear for driving it. Fig. 38 is a development of the interior surface of the cam-cylinder and cams, showing the various positions of the switch-cams. Fig. 39 is a development of a portion of the exterior of the cam-cylinder, showing the method of elevating the horizontal section of the shoulder-cam. Fig. 40 is a front elevation, partly in section, of such parts as are above the table of the needle and cam cylinders, the yarn-stop-off and thread-changing mechanisms, and the devices for actuating the same, omitting the needles and the cam-cylinder attachments. Fig. 41 is a top plan, partly in section, of the yarn-stop-off mechanism. Fig. 42 is a top plan of the clamping-plates and other parts of the thread-changing mechanism. Fig. 43 is a top plan of the parting-bar and its supports. Fig. 44 is a top plan of the thread-cutting knife. Fig. 45 is a front elevation of the retaining-spring for said knife. Figs. 46 to 50, inclusive, are vertical sections of portions of the thread-changing mechanism, illustrating the method of changing the thread. Fig. 51 is a right-hand end elevation of the sliding bearing which supports the intermediate shaft, both forming a part of the thread-changing mechanism. Figs. 52 and 54 are right-hand end elevations of cams which actuate portions of the thread-changing mechanism, and Fig. 53 is a development of a third cam used for a similar purpose. Fig. 55 is a right-hand end elevation, partly in section, of such parts as are above the table of the needle and cam cylinders, the yarn-stop-off and thread-changing mechanisms, and the devices for actuating the same, omitting the needles and the cam-cylinder attachments and including a portion of the web-holder spindle.

The terms "right hand" and "left hand," as used in the foregoing description, refer to the position from which the views are taken relatively to the position of the observer as he faces the front of the machine in Fig. 1.

The same parts are designated by the same reference letters or figures in all the figures of the drawings.

A designates the power-shaft from which the mechanisms for performing the various operations are driven. This shaft is provided with the usual fast and loose pulleys $a$ and $c$, Fig. 1, Sheet 1, through which power is applied to and taken off the machine. It also carries the male part $d$ of a double-cone friction-clutch which revolves therewith, but is free to be moved longitudinally in either direction from a central position into engagement with the female parts $e$ and $f$, which are bolted respectively to the spur-wheels $g$ and $h$, these being of different diameters and mounted loosely on the same shaft A, so as to be capable of revolving independently thereon, but not of moving longitudinally upon it. These gears mesh respectively with gears $k$ and $l$, which also differ in diameter, and are keyed on shaft B, which is directly below shaft A. The friction-cone $d$ at all times drives the machine while knitting is progressing, except for brief periods, as will be hereinafter explained, when the ratchet $c^2$, keyed to hub of gear $h$, is in action.

From the foregoing it will be understood that when cone $d$ is in the central or "stop" position it transfers no power to the machine, and that whichever gear $g$ or $h$ is at other times driven by it will, through the corresponding engaging gear, rotate the shaft B, while the other of said gears will rotate idly on shaft A, according as it is driven by its corresponding gear on shaft B, and also that a high speed will be given by gear $h$ when in engagement and a low speed by gear $g$.

The motion of shaft B is communicated, through crank $m$, connecting-rod $n$, and crank $o$, to shaft C, which is placed vertically above shaft A. Inasmuch as single-crank connections are liable to stop at the dead-points, an auxiliary frictional driving-gear has been provided, consisting of a spur-gear $p$, mounted loosely on shaft C, but not capable of longitudinal motion thereon, the female part $q$ of a cone-clutch bolted to said gear, and the male part $r$ of said clutch feathered on the shaft so as to revolve with and to be capable of longitudinal motion thereon into or out of engagement with the female part $q$. Now gears $k$, $g$, and $p$ are of the same diameter and in engagement at all times with each other; hence the motion of gear $p$ will at all times coincide in speed and direction with that of gear $k$. If, therefore, cone $r$ be in engagement with its female part $q$, it follows that shaft C will be driven from, at the speed, and in the direction of shaft B, thus re-enforcing the action of the crank $o$ at the dead-points; but while shaft B rotates at all times while knitting is progressing shaft C revolves only during circular knitting and during heel and toe knitting, which is performed by reciprocation of the cam-cylinder it oscillates.

In order that oscillating motion of shaft C may be obtained from rotary motion of shaft B, provision is made for increasing the effective length of crank $o$, it being apparent that while the effective lengths of cranks $o$ and $m$ remain the same shaft C will revolve with shaft B, but that if the length of crank $o$ be increased, that of crank $m$ remaining the same, shaft C will oscillate while shaft B revolves still. The expanding-crank $o$ is similar in principle to that described in the former application and the patent granted thereon. As shown in section in Fig. 1, Sheet 1, and in detail in Fig. 23, Sheet 6, it consists of a plate-crank $o$, keyed to shaft C, and having cut in it an open-ended slot which is described from the center of the pin of crank $m$ when it and crank $o$ are horizontal and standing in the same direction, the mouth of the slot being closed by a cap and bolts, as shown. Adjacent to and on the right of crank $o$ is the secondary crank $s$, the hub $t$ of which is feathered on the shaft C, so as to revolve with said shaft, but to be capable of longitudinal motion thereon. To crank $s$ are bolted the blocks $u$ and $v$, curved externally to fit the slot in crank $o$ and having a space between them. Their inner faces are outwardly inclined and parallel to each other. They receive between them the crank-pin block $w$, the sides of which are inclined to correspond with the inclined faces of its blocks $u$ and $v$. The parts are so constructed and adjusted that when their hubs $t$ and $x$ touch cranks $o$ and $n$ will be equal in length and rotary motion of shaft C will be possible, but that when the hub $t$ is moved to the right with crank $s$ and blocks $u$ and $v$ the inclined faces of the blocks will force block and pin $w$ outward from the center of shaft C, thus increasing the effective length of crank $o$.

It is evident that as gear $p$ always revolves the friction-cone $r$ must be out of engagement with its female part $q$ when it is desired to oscillate shaft C. As shown in Fig. 2, Sheet 2, and in Fig. 3, Sheet 3, the hubs of the cone $q$ and of the crank $s$ are grasped by shifter-forks $y$ and $z$, which are pinned to loose collars encircling said hubs. In order to make the motions of both simultaneous, the forks $y$ and $z$ are threaded on the shaft $a'$, which has a right-hand thread cut on one end and a left-hand thread on the other. This shaft is supported in the bearing $b'$, and is oscillated, when required, by the crank $c'$, eccentric-rod $d'$, and eccentric $e'$, the latter being keyed to the shaft D. The throw of the eccentric $e'$ is so proportioned as to oscillate and not revolve crank $c'$, and in one semi-revolution of shaft D to separate the forks $y$ and $z$ as far as required, returning them in the succeeding semi-revolution to their original positions.

At the right-hand end of shaft C there is keyed a spur-gear $f'$, which meshes with gear $g'$, keyed to and driving the counter-shaft E, placed vertically above C. Keyed also to shaft E is a miter-gear $h'$, which engages with and drives the combined spur and miter gear $K'$, which depends from a vertical bearing in the table of the machine, and meshes with and drives the annular spur-gear $l'$, the latter being connected with and driving the cam-cylinder $m'$. The miter-gear $h'$ and the annular gear $l'$ are of the same diameter and pitch. Inasmuch as in oscillating the crank $o$ will pass through less than a semi-revolution, and as it is necessary to make each movement of the cam-cylinder while reciprocating extend through as nearly a full revolution as possible, in order to gain time for raising and lowering a needle in the interval between finishing one course and beginning another, the oscillations of shaft C are doubled in shaft E by making gear $f'$ twice the diameter of gear $g'$.

The position of the double cone $d$, whether in engagement with gear $h$, as in circular knitting, in the central or stop position, or in engagement with gear $g$, producing the slow speed required for reciprocating knitting, is regulated by the lever $n'$, Fig. 2, Sheet 2, which grasps a loose collar $o'$, encircling the neck of the cone. This lever is pivoted at $p'$, and is vibrated by the cam-path of the cylindrical cam $q'$, (keyed to shaft F,) in which a stud $r'$, fixed in the inner end of lever $n'$, bears. A development of the path of cam $q'$ is shown in Fig. 13, Sheet 5, said path being so shaped as in every quarter-revolution of the cam to move lever $n'$ from one to another of its three positions. The position of this cam relatively to the lever $n'$ is controlled, as shown in Fig. 2, Sheet 2, and in detail in Figs. 8, 10, and 12, Sheet 5, by the ratchet $s'$, keyed to shaft F, the pawl $t'$ of which is in intermittent engagement with said ratchet, owing to the intervention at certain periods of the shield $y'$, carried by crank $x'$, which is mounted loosely on shaft F. The pawl $t'$ is pivoted to the bell-crank $u'$, the latter being mounted loosely on the shaft F, and being oscillated continuously by the eccentric-rod $v'$ and the eccentric $w'$, keyed to shaft A.

Since our machine is so designed that the changes required in the position of the lever $n'$ during the knitting of a stocking follow in the order designated by the path of cam $q'$, it is evident that to produce the change required at any period in the making of the stocking it is simply necessary to revolve the cam $q'$ one-quarter of a revolution forward from its position at that time, and also, if the shield $y'$ be so far retracted that one-fourth of the circumference of the ratchet $s'$ is uncovered to the pawl $t'$, it is obvious that this ratchet, with the shaft F and cam $q'$, will be driven forward the circumferential distance necessary to effect the change required.

As shown in section in Fig. 12, there is mounted loosely on the shaft F, to the left of bell-crank $u'$, the loose crank $x'$, to which is bolted the tripping-shield $y'$, which controls the engagement of the pawl $t'$ and ratchet $s'$. The crank $x'$ is supported by the retaining-hook $z'$, pivotally joined to $x'$ at $a^2$, which engages with the teeth of the reversed ratchet $b^2$. The latter is keyed to shaft F and has four teeth set ninety degrees apart. In the position shown in Fig. 10 the shield $y'$ is interposed, the ratchet $s'$ is out of action, and the shaft F is at rest. If, however, the hook $z'$ be tripped, said hook will, with the crank $x'$ and shield $y'$, fall back to the next tooth $d^2$ of the ratchet $b^2$, thus uncovering one-fourth of the circumference of the ratchet $s'$, which ratchet, driven by pawl $t'$, will at once advance that amount, carrying with it shaft F and cam $q'$; but as ratchet $b^2$ is keyed to shaft F this ratchet will also be carried forward with the shaft, moving with it the shield $y'$, which, when the shaft has advanced ninety degrees, will again throw pawl $t'$ out of action.

To change the position of cone $d$, we have then to trip the retaining-hook $z'$. This is effected by the pattern-chain G, (rotating with the drum $e^2$, keyed to shaft H,) which at the proper time vibrates the spring-actuated bell-crank $m^{12}$, pivoted at $n^2$, thus tripping hook $z'$. The shaft H, as shown in Fig. 3, is driven by eccentric $f^2$, (keyed to shaft B,) eccentric-rod $g^2$, crank $h^2$, mounted loosely on shaft H, pawl $k^2$, pivotally joined to crank $h^2$, and ratchet $l^2$, keyed to shaft H. At times just previous to and just subsequent to the making of the heel and toe the machine is driven at a low rate of speed, while necessary changes in the relative positions of its parts are made. The driving mechanism during these periods is the ratchet $c^2$, keyed to hub of gear $h$. (See Fig. 1.)

The ratchet and its connected mechanism are shown in detail in Figs. 7, 8, 9, and 11, Sheet 5. The pawl $o^2$ of ratchet $c^2$ is driven continuously by the eccentric $w'$, keyed to power-shaft A, through the eccentric-rod $v'$, the bell-crank $u'$, and the link $u^2$, connected to the arm $t^2$, to which pawl $o^2$ is pivoted; but while the cone $d$ is in engagement with either of the gears $g$ or $h$ the pawl is prevented from driving the ratchet $c^2$ by the shield $m^2$, which at these times is interposed. The strap $n^2$, which carries the shield $m^2$, is mounted loosely on the hub of ratchet $c^2$, and has a lower projecting arm $p^2$ in sliding engagement with the slotted arm of the lever $q^2$, pivoted at $r^2$, while the lower end of said lever bears on the cam $s^2$, keyed to shaft F. It is evident that if the slotted arm of lever $q^2$ be forced downward, carrying with it arm $p^2$, the shield $m^2$ will be retracted and the ratchet $c^2$ be brought into action. The cam $s^2$, as shown in Fig. 11, has four divisions—two convex and two concave, the two former corresponding with the fast and slow speed positions of cam $q'$ and the two latter with the stop positions of said cam. When the lever $q^2$ bears on the convex portion of cam $s^2$, the pawl is tripped, and when on the concave portion the ratchet is in action. The cams $s^2$ and $q'$ are so disposed on the shaft F relatively to each other that when the cone $d$ is in engagement the ratchet $c^2$ is out of action, and vice versa.

In our present machine, as in the one described in the application and patent referred to, the needle-cylinder $n^3$ is stationary, and the cam-cylinder $m'$, containing the needle-actuating cam-grooves, either revolves continuously around it or, as in knitting the heel and toe, is given a rotary reciprocating motion.

The needle-cylinder $n^3$ is shown in vertical section in Fig. 25, Sheet 7, and in Fig. 6, Sheet 4, and in horizontal section in Figs. 14 and 15, Sheet 5. As shown, it consists of a single cylinder extending from above the cam-cylinder to and through the lever-bed $o^3$. At the bottom it is movably supported—for purposes to be hereinafter explained—by the links $t^8$ $t^8$, Figs. 6 and 15, which grasp pins $u^8 u^8$, secured to lugs at the lower end of the cylinder. Continuous external grooves are provided on the cylinder for guiding the needles and jacks in their vertical motions, which grooves extend from the top of the cylinder to within a short distance of the bottom thereof, excepting in the lower portion of the back of the cylinder, where the needles, being always in operation, require no jacks, and hence the jack-guiding grooves are omitted. The lower portion of the grooves, which is used for guiding the jacks, is made of larger external diameter than the upper part thereof. The needles and jacks are similar to those described in the application and patent previously referred to. As shown in Fig. 25, the needles $h^3$ are each formed with two butts, the upper ones fitting into the needle-actuating cam-path of the cam-cylinder, and the lower ones forming projections by which the jacks $k^3$ and $l^3$ can grasp the needles to pull them into or push them out of action. For convenience, the needles are made of the same shape throughout the cylinder, although one-third (more or less) of the back half thereof, which are always in action, require no lower butts. The jacks $k^3$ and $l^3$ are used with all the needles, except those just specified, which knit the narrowest part of the web in forming the heel and toe pouches. They are of different shapes, as shown in Fig. 25, those designated by $l^3$ being used with the front half of the needles, which are inactive during heel and toe knitting, while those marked $k^3$ are used with the two-thirds (more or less) of the back half of the needles, which are variably operative during that time.

The function of the jacks is twofold—first, to raise the needles out of action by lifting their upper butts above the highest point of the needle-actuating cams, in which case the lower butts of the needles rest on the bottoms of the upper interior spaces of the jacks, and, secondly, to pull the needles down into action again—i. e., sufficiently low for the actuating cam-groove to catch and operate the upper butts. The upper interior space of the jacks is made at least equal in length to the vertical stroke of the needle, plus the height of the lower butt.

The jacks of the front half of the needles, which are raised and lowered in a body, are secured in a jack-holder $m^3$, which is similar in function and design to the one described in the application and patent previously referred to, except as to the means for raising and lowering it.

As shown in Fig. 25 and in Fig. 21, Sheet 6, the jack-holder is simply an annular semi-cylinder, formed at the top with radial notches or grooves to receive the jacks, the latter being held in place by an annular cap $v^8$, secured to the jack-holder by screws and having an inner downturned knife-edged flange, which rests in the notches formed in the upper sides of the outturned bases of the jacks and holds the latter down to the jack-holder.

In the center of the jack-holder there is a vertical slot $w^8$, through which projects one of the two arms $x^8 x^8$, bolted in recesses in the exterior of the needle-cylinder, said arms supporting the standards $y^8 y^8$, the functions of which will be hereinafter described. The slot $w^8$ is made of sufficient length to permit the vertical movement of the jack-holder necessary in moving the needles into and out of action.

The automatic raising or lowering of the jack-holder just previous to or just subsequent to the formation of the heel and toe is effected primarily through the semi-revolution of the shaft D at the proper time, which shaft moves the jack-holder through the eccentric $v^3$, keyed to said shaft, the eccentric-rod $u^3$, the crank $t^3$, fixed to shaft $r^3$, (resting in bearings $s^3$, secured to lever-bed $o^3$, as shown in Fig. 26,) and the arms $q^3 q^3$, secured to said shaft, which grasp pins set in two lugs $z^8 z^8$ at the bottom of the jack-holder. The jack-holder is guided by the cap $p^3$, fitted to lever-bed $o^3$, as shown in Fig. 1.

The standards $y^8 y^8$, Figs. 6 and 25, support the stationary guide-band $a^9$ to lugs, on the bottom of which they are secured. They also serve as guides for the movable guard-band $b^9$, which is similar in function and design to the one described in the application and patent previously referred to. These bands encircle the needle-cylinder and act as guides for the jacks in their vertical motions, the band $b^9$ being made movable vertically, in order that when at the bottom of its stroke, as shown in Fig. 6, Sheet 4, the jacks may be capable of being thrown outward to disconnect them from the needles. The guard-band $b^9$ is reciprocated, as shown in Fig. 25 and in Fig. 14, Sheet 5, by the rod $c^9$, which passes through the table $d^9$ and grasps crank $e^9$, secured to shaft $f^9$, which rests in bearings made fast to the front standard $y^8$. To shaft $f^9$ are secured the arms $g^9 g^9$, which engage the pins $h^9 h^9$, set in the guard-band. When the band is down, as shown in Fig. 6, the sectional band $k^9$, Fig. 14, pressed outward by small spiral springs $X^{91}$, set in the needle-cylinder, throws the jacks outward and downward, disengaging them from the needles.

The cam-cylinder, with the means for automatically reversing the cam-path, is substantially the same as in the application and patent previously referred to, except that in the present machine we have made the back part of the shoulder-cam $f^4$, Figs. 38 and 39, Sheet 10, movable vertically, as will be hereinafter described. The cam-cylinder $m'$ is shown in vertical section in Fig. 25, Sheet 7, and in detail in Figs. 34 to 39, inclusive, Sheet 10.

$m'$ is a plain cylinder, with a flanged base resting in a recess in the upper surface of the annular gear $l'$, the latter consisting of an upper outturned flanged part, to which the gear proper is bolted beneath. Cylinder $m'$ is connected loosely with gear $l'$ through a bolt $x^3$, passing through a vertical lug $w^3$, cast solid with gear $l'$, and screwing into a boss on the yoke $y^3$, carried by the cam-cylinder. A sliding connection between the yoke and the cylinder is made by the screws $z^3 z^3$, which pass through openings $a^4 a^4$ in the cylinder and carry on their inner ends the switch-cams $b^4$ and $c^4$, which have lugs on their convex surfaces projecting through the openings $a^4 a^4$, and which cams act, in conjunction with the upper fixed cam $d^4$ and the lower fixed cam $e^4$, to change the needle-actuating cam-path at each change in the direction of the motion of the cam-cylinder.

It will be seen that the switch-cams $b^4$ and $c^4$, being connected solidly with the annular gear $l'$, form an integral part of the driving mechanism, and also that, as the openings $a^4\ a^4$ are larger than the lugs of cams $b^4$ and $c^4$, which project into them, when, as previously described, the direction of the motion of the annular gear is suddenly changed, as in reciprocating knitting, the cam-cylinder will by its momentum be carried in the direction in which it was being driven to the extent of its independent but limited throw, thus changing the relative position of the cams $d^4$ and $e^4$ with reference to the switch-cams. As shown in Fig. 38, the switch-cams are drawn in full lines in the position for knitting with the cylinder driven in the direction indicated by the arrow. When that direction is reversed, the relative position of the switch-cams with reference to the fixed cams is shown by dotted lines. The openings $a^4\ a^4$ and the projecting lugs of the cams $b^4$ and $c^4$ are so proportioned as to permit an amount of sliding motion of the yoke on the exterior and of the connected cams on the interior of the cylinder sufficient to close the upper and open the lower cam-paths at one side of the double cams $d^4$ and $e^4$, and to open the upper and close the lower paths at the other side of said cams at each change in the direction of the motion of the cam-cylinder. The action of the mechanism in changing the cam-path being the same in every respect as that described in the application and patent previously referred to, it is deemed unnecessary to discuss it further in detail herein.

In our present machine we have bolted the thread-guide $g^4$, which is of the ordinary type, to the yoke $y^3$, instead of securing it, as formerly, to the cam-cylinder, the first method having been found to give better results in feeding the yarn to the needles than the one previously employed. We have also, as stated, made the rear part $f^4$ of the shoulder-cam $e^4$ movable vertically for the purpose of facilitating the raising *en masse* of one-half (more or less) of the needles. As shown in Figs. 38 and 39, the shoulder-cam is made in two parts, which are so formed at the joints that the ends of the actuating-section $e^4$ shall form recessed guideways for the ends of the straight section $f^4$, which are formed to fit said guideways. To facilitate the raising of section $f^4$, it is provided with the attached thumb-screws $k^4\ k^4$, which are tapped into it, and by which the operator raises the cam $f^4$ and secures it in position when raised, and which move in the guiding-slots $l^4\ l^4$, cut in the cam-cylinder. Section $f^4$ is also fitted with a central guiding-bolt $m^4$, sliding in slot $n^4$, and with the retaining-spring $o^4$, secured to the cam-cylinder, which holds section $f^4$ in its lowered position when knitting is progressing.

In the making of socks or such stockings as are provided with ribbed tops it is necessary, after a stocking is completed and removed from the machine, either to remove the needle-cylinder with the needles entirely from the machine, replacing it with a similar cylinder on which a fresh ribbed top has been placed, or to raise all of the needles in the cylinder to one level and then to transfer the ribbed top to the needles thus raised. We propose following the latter method by the use of a transferring mechanism which forms no part of the present invention, and need not therefore be described. After the completion and "running off" of the stocking the clutch-shaft F is so moved automatically as to throw the double cone $d$ out of action, while still leaving the cam-cylinder in motion, as for circular knitting, and driven by the ratchet $c^2$. An automatic tripping-gear for the said ratchet is then thrown into action by the operator through the medium of a lifting-rod $g^3$, which is connected with shifting mechanism by which a movable cam is shifted into and out of position for operating the tripping mechanism. When a position convenient for raising out of action a portion of the needles is reached, the machine stops, the said ratchet being automatically thrown out of gear. The needles are then raised, the operator shifts the automatic tripping-gear to another position, and ratchet $c^2$ is again allowed to drive the machine until a point one hundred and eighty degrees distant from the first stop is reached, when ratchet $c^2$ is again thrown out of action, the machine comes to rest, and the remainder of the needles is raised.

The stopping and starting of the machine are effected through the auxiliary adjusting and hand-operated cam $v^2$. (Shown in Figs. 1 and 2, and in detail in Figs. 8 and 9, Sheet 5.) From the lever $q^2$, previously described, depends the link $y^2$, which connects the former with one arm of the lever $w^2$, pivoted at $x^2$. The outer end of the lever $w^2$ bears on the three-part cam $v^2$, feathered on the shaft B, so as to rotate therewith, but to be capable of longitudinal motion thereon. The roller end of the lever $w^2$ is in line with the central cylindrical part of the cam $v^2$ while knitting is progressing. When it is desired to elevate the needles, the cam $v^2$ is shifted to the left, and in the course of its rotation the roller end of lever $w^2$ is depressed by the projection $a^3$, lifting-link $y^2$, lever $q^2$, arm $p^2$, and shield $m^2$, thus tripping the pawl of ratchet $c^2$ and stopping the cam-cylinder. Cam $f^4$ is then raised, carrying with it the portion of the needles whose butts rest on it until the upper butts of said needles strike the retaining-spring $h^4$, Fig. 25, (a coil-spring of the ordinary type,) said spring holding the needles out of action in their elevated position. The guard-band $b^9$, which has been lowered to disengage the jacks from the needles, is then again raised; cam $f^4$ is lowered, and cam $v^2$ is moved to the right, bringing the end of lever $w^2$ on a low part of cam $v^2$, thus retracting shield $m^2$ and starting the machine, which remains in motion until a projection $z^2$, similar to $a^3$, but ninety degrees distant from it, again raises lever $w^2$ and shield $m^2$ and stops the machine with cam $f^4$ under the remainder of the needles, which are then raised, as were the others, thus bringing all of the needles in position for the transferrer. The cam $v^2$ is moved longitudinally through the encircling collar $b^3$, Figs. 1 and 2, which is threaded on the screw-shaft $c^3$, the latter having a bearing $d^3$ cast solid with the cap $e^3$. The shaft $c^3$ is oscillated, when required, through the crank $f^3$ and the lifting-rod $g^3$, the latter being raised and lowered by hand at the proper times.

To the cam-yoke are attached, as in the application and patent previously referred to, the spring-latches $p^4$ $p^4$, which engage with the angular studs $q^4$ $q^4$, in order to hold the cam-cylinder against accidental displacement while knitting is progressing. The cam-cylinder also carries the forked standard $r^4$ for revolving the web-holder, which is similar in function and design to that marked 83 in the application and patent referred to.

As shown in Fig. 6, the needle-cylinder is so supported as to be capable of vertical motion while knitting is progressing, being so arranged for the purpose of "fashioning" or shaping the web of the leg and foot by varying the length of the stitches throughout each knitted course. When a stocking conforms fully to the leg and foot of the wearer, some parts of said stocking—as, for instance, the calf of the leg—should be straight in front, while the rear should be full or curved, and, conversely, at the instep the top or front should be full and curved while the bottom or back should be straight and tight. These variations in the shape of the web may be effected by varying the length relatively to each other of the stitches of each knitted course—i. e., in the first case above cited, beginning at the front, where the web is straight and the stitches are shortest, they are gradually lengthened to the back of the stocking and then gradually shortened again to the front; and, again, in the second case above given, beginning at the front, where the web is curved and the stitches are longest, the latter are gradually shortened to the back of the stocking and then again gradually lengthened to the front. These variations in the relative lengths of the stitches of each knitted course we propose to effect by varying—for each stitch of said course—the distance from the top of the needle-cylinder to the actuating cam-path, and hence to the needles. As is well known, the length of the stitches in circular machines of this type usually depends entirely on the position of the needle-cylinder relatively to the needles, for, since the cam-cylinder and its actuating-path are never vertically moved, it follows that the stroke of the needles in knitting will be always between the same vertical limits, and therefore, if the distance between the top of the needle-cylinder and the tops of the needles be increased or decreased, that (as the web within the cylinders is so secured that it cannot be drawn over the top of said cylinder) more or less yarn per stitch will be drawn by the needles down into the grooves, resulting in the formation of longer or shorter stitches, as the case may be.

As shown in Fig. 2, Sheet 2, Fig. 6, Sheet 4, and Fig. 15, Sheet 5, the needle-cylinder $n^3$ is vertically supported by the links $t^8$ $t^8$, which grasp pins $u^8$ $u^8$, set in the bottom of cylinder. The links $t^8$ $t^8$ are pivotally joined to the arms $l^9$ $l^9$, cast solid with the sleeve $m^9$, which oscillates loosely on the shaft D, using said shaft merely as a pivotal support. Projecting to the rear there is also cast solid with the sleeve $m^9$ the arm $n^9$, Fig. 6, which is oscillated vertically by the two-part rod $o^9$, which is pivotally connected with and vertically reciprocated by the link-block of a link $p^9$ of the ordinary reversing type, said link transmitting the motion of either of the eccentrics $q^9$ or $r^9$, which are of the same size and eccentricity, and are connected with the link by the straps and rods $s^9$ and $t^9$, and thereby to the vertical rod $o^9$.

The eccentrics $q^9$ and $r^9$ are keyed to the shaft $u^9$, properly supported from and beneath the table $d^9$, which shaft, as will be hereinafter explained, revolves continuously with the same speed as the cam-cylinder. One of said eccentrics is so keyed to said shaft as that when the thread-guide $g^4$ is passing the central point of the front half of the needle-cylinder it shall, if in gear with rod $o^9$, raise the cylinder $n^3$ to the highest point of the vertical reciprocation which said cylinder must make, if in gear with either of said eccentrics, and the other of said eccentrics is so keyed to said shaft that when in gear with rod $o^9$ the cylinder shall be at the highest point of its vertical reciprocation when the thread-guide is passing the central point of the rear half of the needle-cylinder.

From the foregoing it will be seen that unless the link $p^9$ is in the central position, as in Fig. 6, the needle-cylinder is necessarily in gear with either of the two eccentrics $q^9$ or $r^9$, and that since the shaft $u^9$ has a motion coincident with that of the cam-cylinder, the needle-cylinder must during the knitting of a course make a vertical reciprocation consisting of a downward and an upward stroke, and also that the highest point of this reciprocation will occur either at the center of the front or the center of the back half of the needles, depending on which of the eccentrics $q^9$ or $r^9$ is in gear with said cylinder. Either of the eccentrics $q^9$ or $r^9$ is brought in gear with rod $o^9$ by so moving the link that either of the respective eccentric-rods $s^9$ or $t^9$ is in line vertically with $o^9$. The link is moved in either direction from the center by the rod $v^9$, one end of which engages with a pin $a^{10}$, which is secured to and projects from the center of the left-hand face of the link. The rod $v^9$ is reciprocated in the guide-blocks $w^9$ $w^9$ by the bell-crank $x^9$, (pivoted at $y^9$ on the support $m^{10}$,) the link $z^9$, and the bell-crank $a^{10}$, pivoted at $b^{10}$, the shorter end of which bears on the pattern-chain $c^{10}$, driven by a suitable drum keyed to shaft H. The pattern-chain $c^{10}$ thus regulates the form of the web. When it is desired that the stitches shall be of equal length throughout the course, the link is placed in the central position, as shown in Fig. 6, in which case it oscillates idly on its link-block, giving no motion to the rod $o^9$.

Since the eccentrics $q^9$ and $r^9$ are of equal eccentricity, it follows that the reciprocating stroke of the needle-cylinder will always be of constant length, no matter which is in gear, and that consequently, with the mechanism thus far described, the shortest stitches of one course will be equal in length to the shortest stitches in any other course, the longest stitches in one to the longest stitches in any other, and so on; but if we can raise or lower together with respect to the needles the vertical limits between which this constant stroke of the needle-cylinder is made, it also follows that while the lengths of the stitches in each course will constantly vary with respect to each other we shall increase or decrease the average length of the stitches in a course as the vertical limits of the stroke are raised or lowered.

The raising or lowering of the limits of the stroke is effected, as shown in Figs. 6 and 15, by increasing or decreasing the effective length of the driving-rod $o^9$. As before stated, this is a two-part rod, one of the parts having a right-hand and the other a left-hand thread cut on its end, and both being united by the hexagonal turn-buckle or nut $d^{10}$, which has corresponding right and left hand threads cut in its interior. It is evident that if $d^{10}$ be revolved horizontally in one direction it will separate the parts of rod $o^9$, and if in the other draw them together, thus increasing or decreasing the effective length of $o^9$ and raising or lowering the vertical limits of the stroke of cylinder $n^3$. This partial revolution of nut $d^{10}$ is effected through the lever $e^{10}$, the outer end of which has a hexagonal socket fitting closely the nut $d^{10}$, and acting both as a guide and as a means of oscillating said nut. The lever $e^{10}$ is oscillated on the rod $o^9$ as a center by the helical cam $f^{10}$, which oscillates loosely on the shaft K, using said shaft merely as a pivotal support. In the path of cam $f^{10}$ a pin $g^{10}$ on the inner end of lever $e^{10}$ fits, by which in its oscillation the cam moves said lever. The lever is guided by a pin fixed to it, which moves in a circular slot cut in the guide-plate $h^{10}$, Figs. 6 and 15, which is bolted to the bottom of the guide-block $k^5$. The cam $f^{10}$ is oscillated as required by the pattern-chain $k^{10}$, driven by a suitable drum on the shaft H, through the bell-crank $l^{10}$, pivoted at $b^{10}$, and the link $n^{10}$, which grasps a pin secured to the cam.

The shaft $u^9$, which gives motion to the cylinder-reciprocating gear, is driven as follows: On the shaft C there revolves continuously while knitting is progressing the loose gear $p$, which, as previously explained, has a motion coincident with that of shaft B, and hence makes but one-half as many revolutions as the cam-cylinder. To the right of this gear and keyed to its extended hub is the sprocket-wheel $o^{10}$, which through the chain belt $p^{10}$ drives, without slip, a corresponding sprocket-wheel $q^{10}$, keyed to shaft $r^{10}$, Fig. 5, suitably supported from and above the table $d^9$. On the other end of $r^{10}$ there is a sprocket-wheel $r^{109}$ of the same size, which drives the chain belt $s^{10}$, which in turn drives the sprocket-wheel $t^{10}$, of same size as $q^{10}$, keyed to short shaft $u^{10}$, suitably supported from and above the table $d^9$. On shaft $u^{10}$ is keyed the combined spur and miter gear $v^{10}$, which, through an opening in the table, drives the spur-gear $w^{10}$, keyed to shaft $u^9$. Inasmuch as gear $w^{10}$ is but one-half the diameter of gear $v^{10}$, it follows that the shaft $u^9$ will while knitting progresses revolve at a speed coincident with that of the cam-cylinder.

It is apparent that any of the many well-known mechanisms for transferring a reciprocating motion from one of two eccentrics to a rod—such as $o^9$—or for reversing the action of a single eccentric, a reciprocating motion from which is given to such a rod, could be applied to the raising and lowering of the needle-cylinder, as herein described.

It will also be seen that if the object be simply to vary the general tightness of the knitting of the various courses while a stocking is making the link $p^9$ will remain permanently in the central position. The changes in the length of this rod, through the action of the cam $f^{10}$, will then gradually raise or lower the needle-cylinder as may be required. Other changes in the form and arrangement of the devices comprising this feature of our invention might be made without departure from the nature or spirit thereof.

We have so designed our machine as to make it unnecessary to stop the cam-cylinder, except under extraordinary circumstances, during the knitting of a complete stocking. This is effected by connecting the parts whose relative positions require changing (to throw them into or out of operation just previous or subsequent to the formation of a heel or toe) to a single shaft D, the motion to the various parts being transmitted from said shaft by eccentrics or cranks keyed to the shaft.

It is obvious that a semi-revolution of shaft D will give the eccentrics or cranks their full throw in one direction, thus putting the attached mechanisms in gear, and that the subsequent semi-revolution, in whichever direction it may be made, will return said eccentrics or cranks to their original position, thus throwing the attached mechanisms again out of gear.

The advantages of this system are, first, but one motion (i. e., that of shaft D) to effect by pattern-chain in changing from circular to reciprocating knitting, and vice versa; second, entirely positive connections between the parts whose positions are to be changed and the acting mechanism (shaft D) for effecting the change, and, third, the ease with which, by extending the change-shaft D, one pattern-chain can control the changes for a number of knitting-heads.

The change-shaft D, with its attached mechanisms, is shown in Figs. 1 to 4, inclusive. As shown in Fig. 2, there are attached to this shaft, first, the crank $o^6$, which, acting through the yoke $p^6$ (see Fig. 3) and the hooked rod $q^6$, made fast to said yoke, throws in and out of gear, as will be hereinafter explained, the mechanism controlling the automatic raising and lowering of the needles out of and into action; second, the eccentric $e'$, Fig. 2, Sheet 2, which, as previously explained, through rod $d'$, crank $c'$, and screw-shaft $a'$, lengthens and shortens the expanding-crank $o$ and throws into and out of action the auxiliary driving-cone $r$; third, the eccentric $v^3$, which, through rod $u^3$, (see Fig. 6, Sheet 4,) crank $t^3$, shaft $r^3$, and cranks $q^3$ $q^3$, Fig. 15, Sheet 5, reciprocates vertically the jack-holder $m^3$, thus throwing into and out of action the needles controlled by the latter, and also, through mechanism, as will be hereinafter explained, connected with said shaft $r^3$, throws into and out of action a yarn stop-off and a web-holder similar in function to those described in the application and patent previously referred to.

It will thus be seen that the shaft D controls the action of all the mechanism which is inoperative during circular knitting and in action during reciprocating knitting, and that an angular motion of one hundred and eighty degrees of said shaft from its position during circular knitting will throw all of its attached mechanisms into action, while a return to its original position will render them again inoperative.

The time at which either semi-revolution of shaft D shall occur during either a circular or reciprocating course of the cam-cylinder is approximately fixed by the position of the upper stitch-cam $d^4$, Fig. 38, Sheet 10. Since the jack-holder is to be raised or lowered by the semi-revolution of the shaft D, and since the cam $d^4$ must be entirely clear of the upper butts of the needles controlled by said jack-holder when the needles are ascending or descending, it follows that the motion of shaft D must occur while the cam $d^4$ is beneath the remaining needles—i. e., while the cam-cylinder is traversing less than one hundred and eighty degrees of its angular motion. The mechanism for producing this semi-revolution of the shaft D within this limited time is shown in detail in Figs. 16 to 20, inclusive, Sheet 6. As shown in Figs. 2 and 4, there is keyed on the right-hand end of shaft D the crank $v^6$, actuated by connecting-rod $w^6$, the latter being operated by crank $x^6$ on the short shaft $y^6$. The shaft $y^6$ is revolved by the spur-gear $z^6$, keyed to said shaft, which meshes with a similar gear $a^7$, keyed to the intermittently-operating shaft $b^7$, the latter being supported, as is the shaft $y^6$, in bearings bolted to an extension of the frame. Since the diameters of the gears $a^7$ and $z^6$ are to each other as four to one, it follows that if shaft $b^7$ be moved through forty-five degrees shaft D will make a semi-revolution.

The shaft $b^7$, while entirely distinct from the shaft B, is in alignment axially with said shaft, and as shaft B makes but one-half as many revolutions as the cam-cylinder makes revolutions or reciprocating movements, it follows that if at the times required it is temporarily connected with and revolves the shaft $b^7$ through an angular distance of forty-five degrees the necessary changes in the relative positions of the parts will be effected while the cam-cylinder is moving through ninety degrees of its circular or reciprocating course. To effect this temporary connection of the shafts, there is keyed (as shown in Figs. 1, 4, 16, and 17) to the right-hand end of shaft B the radially-slotted arm $d^7$, which carries in its slot or groove the L-shaped block $e^7$, the latter being pressed outward from the center of shaft by the spring $f^7$, placed in the bottom of the slot, which spring forces the block as far outward as the retaining-strap $h^7$, Fig. 4, will permit. The block is kept in place by the retaining-plate $g^7$, bolted to left-hand face of the arm $d^7$. At its outer end, in suitable bearings, the block carries the anti-friction roller $k^7$, which during a portion of the revolution of the arm strikes against the tripping-wheel $l^7$, which is to reduce the friction of the parts, mounted loosely on the power-shaft A, though it is evident that a stationary cam would serve the same purpose, with, however, additional friction and wear. The diameter of the wheel $l^7$ is so proportioned with reference to the extreme length of arm $d^7$, and the wheel is so placed, as in a portion of the revolution of said arm (less than forty-five degrees) to force roller $k^7$ and block $e^7$ inward sufficiently to clear a block $s^7$ in the same vertical plane, and corresponding in height, breadth, and distance from the center with block $e^7$, and forged solidly with the crank or arm $p^7$, which is mounted loosely on the shaft $b^7$ and held during circular knitting in an approximately upright position on said shaft by the retaining-hook $q^7$, pivotally joined to the crank or arm $p^7$ and engaging the reversed ratchet $r^7$, which is keyed to shaft $b^7$. On its left-hand face arm $p^7$ has pivotally joined to it the pawl $o^7$, which engages the ratchet $n^7$, keyed to shaft $b^7$. Ratchets $n^7$ and $r^7$ have each eight teeth set equally distant on their circumferences.

In the position shown in solid lines in Fig. 18 the block is out of the range of rotation of the projecting end $m^7$ of block $e^7$, for before the latter can touch block $s^7$ it is forced inward by the tripping-wheel $l^7$, and is compelled to pass between block $s^7$ and the pawl $o^7$. If, however, the retaining-hook $q^7$ be lifted, both it and the arm $p^7$ will fall backward and downward forty-five degrees, as shown by dotted lines in Fig. 18, the pawl $o^7$ being at the same time carried backward to the next preceding tooth of ratchet $n^7$. In this position of arm $p^7$ the projection $m^7$ will in its next revolution strike block $s^7$, carrying arm $p^7$, pawl $o^7$, ratchet $n^7$, and shaft $b^7$ forward to the former position. During this movement the trip-wheel $l^7$ has gradually forced projection $m^7$ radially inward until, when said position has been reached, the latter is just out of engagement with block $s^7$. As ratchet $r^7$ has also been carried forward with the shaft $b^7$, the arm $p^7$ will be held out of range of block $e^7$ by the retaining-hook $q^7$ until the latter is again tripped. The tripping of the retaining-hook $q^7$, which occurs just previous to the beginning and the end of reciprocating knitting, is effected by projections on the pattern-chain M, Fig. 2, which passes under an offset on the side of hook $q^7$. The chain is driven by drum $a^8$, keyed to shaft H, and passes over the pulley $b^8$, mounted loosely on shaft $b^7$, being led also beneath the guiding-rollers $c^8$ $c^8$, Fig. 4, of the adjusting turnbuckle $d^8$, (see Fig. 4,) which is suitably secured to the frame.

The ratchet $n^7$ is provided with the detent $t^7$, pivoted to the suitably-supported standard $u^7$. The shaft $b^7$ is prevented from being carried by its momentum too far forward by the locking-bar $w^7$, which faces the ratchet $r^7$, and a boss $z^7$, made on the hub of arm $p^7$. The bar $w^7$ is pressed against the boss $z^7$ and ratchet $r^7$ by the spring $x^7$ acting against the standard-bearing $y^7$. As shown in Fig. 20, the locking-bar effectually prevents the forward motion of ratchet $r^7$ when the stationary position of arm $p^7$ has been reached; but when arm $p^7$ falls backward, as shown in Fig. 19, the boss $z^7$ forces the locking-bar $w^7$ sufficiently to the rear to clear the tooth with which it has been in engagement, and when arm $p^7$ returns, carrying shaft $b^7$ and ratchet $r^7$ with it, the boss $z^7$ is so shaped as to permit the locking-bar $w^7$ to move forward and lock and hold the next following tooth of ratchet $r^7$. The shaft $b^7$ is thus held between the detent $t^7$ and the locking-bar $w^7$. As the movement is made at a low rate of speed, no difficulty is experienced in picking up and stopping the shaft without the aid of cushioning-springs.

It is apparent that the actuating eccentrics and cranks on shaft D may be so proportioned that an oscillation less than one hundred and eighty degrees of said shaft will throw the connected parts into action, and that a return oscillation through the same angular distance will throw them out of action. It is also obvious that the relative proportions of the gears $a^7$ and $z^6$ may be considerably modified without materially affecting the movement of shaft D within the time required.

The mechanism for automatically raising and lowering the needles, which are variably operative during heel and toe knitting, is shown in Figs. 25 to 33, Sheets 7 to 9, inclusive. As shown in section, Fig. 25, the arrangement of the levers is substantially the same as in the application and patent previously referred to, but we have replaced the pattern-drums described in said application and patent for moving the levers by horizontally-reciprocating cam-bars moving at right angles to the parallel levers, and actuated, as shown in Fig. 29, by spring-driven helical cams whose motion is controlled by a side escapement of the ordinary type.

The needles to be separately raised and lowered during heel and toe knitting comprise about one-third (more or less) of the whole number, this proportion being made up of the two one-sixths of the back needles nearest to the ends of the series of front needles which is raised *en masse* out of action by the jack-holder at the end of tubular knitting. These variably-operative needles are thrown out of action alternately from each of the two series which make up their total number, as above specified, beginning with the ends of these series which are nearest to the front needles and proceeding successively until the inner ends of the series are reached and all the variably-operative needles are out of action, the narrowest course in the heel or toe pouch being then reached. The needles are then thrown into action in the inverse order from that in which they were thrown out, and widening progresses until, when the widest part of the pouch is reached, all of the variably-operative needles are in action and tubular knitting with all of the needles is resumed.

Each of the variably-operative needles is provided, as shown in Fig. 25, with a jack $k^3$, said jacks being each connected by a pin-and-slot connection with a lever $s^4$, fulcrumed on a knife-edge bearing $t^4$, bolted to lever-bed $o^3$, guided by slotted guide-bars $u^4$ and $v^4$, bolted to lever-bed $o^3$ and kept in place by a cap $w^4$, bolted to lever-bed $o^3$, which cap has an internal boss so formed as to fit closely upon a curved projection on the upper side of each of the levers $s^4$. The ends $x^4$ of the levers $s^4$ are suitably rounded, and each engages the forked end of a supplementary lever $y^4$, fulcrumed at $z^4$ and guided by the slotted guide-bars $a^5$ and $b^5$, bolted to lever-bed $o^3$. As shown in Fig. 26, the levers $y^4$ are parallel, and those on the right-hand wing of the lever-bed extend beyond the fulcrum $z^4$. To them, at a point $c^5$ near their extremities, and to those on the left, at a point $d^5$ between the fulcrum and cylinder where the leverage is the same as that of the left-hand levers, are pivotally attached the lifting-pins $e^5$, which engage, through pins $h^5$, set in their lower ends, the cam-paths of the cam-bars $f^5$ and $g^5$, by which they are operated. These bars reciprocate in guideways $k^5$ $k^5$ $k^5$, Figs. 2 and 6, bolted to lever-bed $o^3$, and $l^5$ $l^5$, Figs. 2 and 3, formed in the frame. During circular knitting they are separated to their full throw, as shown in Fig. 2. During heel and toe knitting they complete one reciprocation, their inmost position at the narrowest parts of the heel and toe being shown in Fig. 26. As shown in Fig. 25, the body of the bar is ⊔-shaped, and, as shown in Figs. 30 to 33, inclusive, similar cam-paths are formed on the inner sides of the vertical parts of the bar, which paths act upon the projections $h^5$ of the lifting-pins $e^5$. The said cam-paths are so shaped as when the bars are widely separated, Figs. 32 and 33, and circular knitting is progressing, to elevate the pins $e^5$ of the left-hand parallel levers $y^4$ and depress the pins of the right-hand levers, thus lowering the jacks $k^3$ of all the variably-operative needles and throwing said needles into operation, and when at the inmost point of their reciprocation, as in Figs. 30 and 31, to depress the pins of the left-hand levers and elevate those of the right hand, thus raising all jacks $k^3$ of the variably-operative needles and throwing said needles out of operation.

As shown in Figs. 26 and 29, the bar $g^5$ is placed vertically over the shaft $k$, and motion is given it by a stud-pin $m^5$, which rests in and is actuated by the thread of a helical cam $n^5$, keyed to shaft K. The bar $f^5$ is on the same level as $g^5$, but is placed in rear of the shaft K, motion being given it by a curved arm $o^5$, Fig. 28, bolted to bar $f^5$, the point of which rests in and is actuated by the thread of a helical cam $p^5$, similar in all respects to $n^5$, and also keyed to shaft K. The thread in cams $n^5$ and $p^5$ is of constant pitch, and is cut, as shown in Fig. 29, left-handed on one-half of the cams and right-handed on the other, in order that the actuating-pins $m^5$ and $o^5$ may in one revolution of shaft K, with its attached cams, cause the cam-bars $g^5$ and $f^5$ to make one complete reciprocation. The movement of the shaft K being controlled, as previously stated, by an escapement, the cam-bars have in consequence a step-by-step motion, which is made equal to half the distance between the actuating-pins $h^5$ of two consecutive lifting-pins $e^5$.

Since during a reciprocation of the bars the total number of the step-by-step movements is made equal to twice the number of pins $e^5$, it is evident that during the time specified all of the pins with their connected levers will be raised and lowered once, and since one of the bars is set relatively to the pins in advance of the other by an amount equal to the space passed over in one step-by-step movement, it follows that the right and left hand levers will be alternately affected. It is also obvious, since the bars are separated to their fullest extent in circular knitting, that when they move inward the outer levers and needles of both series will be first affected in narrowing, and that when they move outward the inner levers and needles will be first affected in widening. Thus, as shown in Figs. 32 and 33, let the bar $g^5$ be moved as far to the left or outward as possible and the bar $f^5$ be moved as far to the right as possible, the position being that maintained during circular knitting. If, now, the step-by-step motion of the shaft K begins, the bars will move in the direction indicated by the arrows, the right-hand or outermost pin of $f^5$ being the first affected, then the left-hand or outermost pin of $g^5$, and so on, successively and alternately, until the pins $e^5$ and bars $f^5$ and $g^5$ are in the position shown in Figs. 30 and 31—i. e., when the narrowest point of the heel is reached. Here the motion of the bars is reversed and they begin their return movement in the direction indicated by the arrows, the right-hand pin of $g^5$, which was the last to be lowered, is the first to be raised; then the left-hand pin of $f^5$, and so on, successively and alternately, till all of the pins $e^5$ are moved in the inverse order and direction of their movement during the first half of the reciprocation.

The step-by-step movement of the shaft K is primarily produced by the eccentric $q^5$, Fig. 3, keyed to the shaft B, the open-ended rod $r^5$ of which when shipped on the pin $s^5$ of the crank $t^5$, which is keyed on the left-hand end of shaft L, gives that shaft one vibratory movement for each rotary reciprocating movement of the cam-cylinder $m'$. At the right-hand end of the shaft L, Fig. 4, is keyed the crank $u^5$, which, through the link $v^5$, oscillates the crank $w^5$, mounted loosely on the shaft $k$. This crank, Figs. 26 and 29, carries the pawl $x^5$, which is pivotally joined to it, and which in turn drives the ratchet $y^5$, which is keyed to the spring-hub $z^5$, the latter being mounted loosely on the shaft K. A detent, not shown, but corresponding with detent $p$ shown in Fig. 26 of the drawings of the former patent referred to, prevents any backward movement of the ratchet. In the projecting bosses $a^6$ $a^6$ of hub $z^5$ are secured the rods $b^6$ $b^6$, which draw forward the springs $c^6$ $c^6$, attached to their ends, and fastened also to the driving-pins $d^6$ $d^6$ of the escapement-wheel $e^6$, which is keyed to shaft K. It is thus evident that when the shaft L is oscillating there is a constant tension on the escapement-wheel $e^6$, tending to draw forward said wheel with the shaft K and the attached cams $n^5$ and $p^5$. On the other side of the rim of wheel $e^6$ are fixed the semi-cylindrical pins $f^6$, which engage the escapement-lever $g^6$, keyed to shaft L, and co-operate with said lever in controlling the forward motion of the wheel $e^6$.

Since the shaft B makes one-half as many revolutions as the cam-cylinder $m'$ makes reciprocating movements, it is evident that the eccentric $q^5$ when in gear will give to the escapement-lever $g^6$ one vibratory movement for each movement of the cam-cylinder. As shown in detail in Fig. 22, Sheet 6, the lever $g^6$ is provided with two actuating projections $h^6$ and $k^6$ on the side next the wheel $e^6$, the inner end of one passing slightly beyond that of the other. The pins $f^6$ of the escapement-wheel $e^6$ strike first the projection $h^6$, passing thence, as lever $g^6$ is vibrated, to the projection $k^6$, and escaping on the return vibration.

Since each of the pins $f^6$ is thus twice caught, it follows that the total number of them corresponds with the number of complete reciprocations which the cam-cylinder is required to make in forming a heel or toe pouch.

We have for convenience so constructed our machine that the cams $n^5$ and $p^5$ make but one complete revolution in reciprocating the cam-bars $f^5$ and $g^5$; but if the threads cut in the said cams be made of finer pitch, so that the cams make two or more complete revolutions in reciprocating the bars, it is evident that the diameter and the number of pins of the escapement-wheel may be materially reduced. We have also provided a separate helical cam for driving each of the bars $f^5$ and $g^5$; but if the driving-points of said bars be so formed and arranged as to enter the thread of one of these helical cams at an angular distance of one hundred and eighty degrees apart one such helical cam will suffice for both cam-bars.

In order to preserve a constant average tension of the springs $c^6$ $c^6$ throughout and at the close of reciprocating knitting, the number of teeth on the ratchet $y^5$ is made equal to the number of semi-cylindrical pins $f^6$ on the escapement-wheel. Since its pawl $x^5$ and the lever $g^6$ receive the same number of step-by-step impulses from the shaft L, and since it requires a complete reciprocation of both to permit the escape of one pin $f^6$ from the lever and to force the ratchet $y^5$ one tooth forward, it follows that the initial tension given the springs $c^6$ $c^6$ will always be maintained and that the mechanism when once set will be always ready for action.

The means for unlocking and throwing into action the escapement mechanism just previous to reciprocating knitting and for throwing out of action and locking the said mechanism at the end of reciprocating knitting are shown in Figs. 2 and 3 and in Figs. 26 and 27, Sheet 8. There is mounted loosely on shaft L, Fig. 3, the locking-lever $l^6$, the interior of the hub of which is slotted, as shown in Fig. 27, in which the lever is horizontal and in position for reciprocating knitting. In the shaft L is set the feather $m^6$, which is so proportioned relatively to the size of the slot $n^6$ of the hub of lever $l^6$ that when said lever is horizontal shaft L will be free to oscillate; but when lever $l^6$ is raised, as shown in Fig. 3, the right-hand side of slot $n^6$ will press against the feather $m^6$ and lock the mechanism. Again, as shown in Fig. 3, the eccentric-rod $r^5$ terminates in an open hook $u^6$, which can be unshipped from the pin $s^5$ of crank $t^5$ by the raising-rod $q^6$, thus depriving the escapement mechanism of its actuating power. In Fig. 3 the rod $r^5$ is shown unshipped in the position for circular knitting. When lowered, the hook $u^6$ rests on the pin $s^5$, seating itself when the proper position is reached.

It is evident that the upward movements of rod $r^5$ and locking-lever $l^6$ must be made simultaneously. They are effected primarily by the crank $o^6$, keyed to the left-hand end of shaft D, Fig. 3, which revolves in the yoke $p^6$, forged solid with the rod $q^6$, the latter being guided at $r^6$, having a sliding connection with lever $l^6$, and terminating in the open hook $t^6$, which during reciprocating knitting lowers the eccentric-rod $r^5$, and during circular knitting raises and unships the said rod, at the same time raising the locking-lever $l^6$.

It is evident that a semi-revolution of shaft D will lower the rod $q^6$, lever $l^6$, and rod $r^5$, unlocking and throwing into action the escapement mechanism, and that the succeeding semi-revolution of said shaft will raise rod $q^6$, lever $l^6$, and rod $r^5$ and reverse this action. The crank $o^6$ and the yoke $p^6$ are of course but the mechanical equivalents of an eccentric the radius of eccentricity of which is equal to the effective length of the crank $o^6$.

The lever-bed $o^3$, on which the system of levers is fulcrumed, is suitably supported by the framing and table of the machine.

The web-holder $s^8$, (shown in elevation in Fig. 24, Sheet 7,) being the same in function and design as that described in the application and patent previously referred to, to which reference may be had, is only illustrated here for the purpose of showing its application to this machine. Its driving-rod $r^8$ is reciprocated vertically by a cam $x^{10}$, corresponding in function and form with the cam marked $x^3$ in the application and patent before referred to. The cam $x^{10}$ is placed on the shaft E, which reciprocates during the knitting of the heel and toe at the same angular speed as the cam-cylinder. On cam $x^{10}$ the driving-rod $r^8$ is pressed by the spring $y^{10}$, acting between the collar $z^{10}$ of a fixed guide-arm (secured to a standard, not shown) and a collar $a^{11}$, secured to rod $r^8$. Between the two upper fixed collars of the rod $r^8$ is loosely mounted the arm $b^{11}$, terminating in a fork which engages pins $c^{11}$ $c^{11}$, fixed to the loose collar $d^{11}$, which is loosely mounted on the spindle $e^{11}$ of web-holder $s^8$. The web-holder is pressed upward by the spring $f^{11}$, placed on standard $g^{11}$, acting on arm $h^{11}$, which spring, standard, and arm correspond in function and design with those respectively marked $v^3$, $p^3$, and $o^3$ in the application and patent before referred to. The socket of the arm $h^{11}$ grasps the web-holder between loose collar $d^{11}$ and a small fixed collar $k^{11}$. Below the collar $d^{11}$ there is a fixed collar $l^{11}$, between which and collar $k^{11}$ the web-holder is grasped by the arms $b^{11}$ and $h^{11}$ for producing its vertical reciprocations. The spindle $e^{11}$ is revolved by the forked standard $r^4$, fixed to cam-cylinder, as shown in Figs. 34 and 37. The web-holder is thrown into and out of action by the semi-revolution of shaft D, which at the proper time oscillates shaft $h^8$ through crank $e^8$, keyed to shaft $r^3$, the link $f^8$, and crank $g^8$, keyed to shaft $h^8$, the oscillations of said shaft being transmitted through the crank $m^8$ and link $n^8$ to the lever $o^8$, pivoted at $p^8$, which engages pins fixed in the loose collar $g^8$, encircling rod $r^8$. When this collar is elevated, as shown in Fig. 24, it presses against the collar $a^{11}$, fixed to rod $r^8$, and the driving-rod is thus raised beyond the range of action of the cam $x^{10}$, in which position it remains during circular knitting. Previous to reciprocating knitting the succeeding semi-revolution of shaft D lowers collar $g^8$ to the table, bringing rod $r^8$ again within the range of the cam $x^{10}$.

The automatic stop-off for stopping the supply of yarn when in reciprocating knitting the thread-guide passes the last needle which is in operation is shown in Fig. 40, Sheet 11, Fig. 41, Sheet 12, and Fig. 55, Sheet 13. This mechanism is similar in function to that described in the application and patent previously referred to. It consists, essentially, of two plates, the first of which is fixed to a rod which during heel and toe knitting is reciprocated continuously and with a constant stroke by an eccentric keyed to a shaft which makes as many revolutions as the cam-cylinder makes reciprocating movements. The second plate, between which and the first plate the yarn passes, is capable of reciprocation when driven by the first plate, and is provided with a cushioning-spring, so that when the first plate in its reciprocating stroke strikes the second plate, thus stopping off the supply of yarn, the second plate yields and recedes with the first plate to the end of the stroke of the latter, returning with said plate in its backward stroke until the second plate reaches its former position, when the yarn is freed, until, in the course of the next reciprocation, the first plate again strikes the second. Inasmuch as in reciprocating knitting the number of needles in operation varies constantly, thus necessitating a later or earlier stopping off of the yarn-supply, means are provided for giving the second or spring-pressed plate a different initial position relatively to the acting plate for every movement of the cam-cylinder, so that the first plate may meet the second at an earlier or later time in its reciprocating stroke. After the supply of yarn is checked the cam-cylinder, which has a stroke of constant length, continues on beyond the last needle in operation to the end of said stroke, when it begins to return. To prevent the yarn between the stop-off and thread-guide from breaking after the supply is checked while the cam-cylinder is finishing its stroke, and to keep it taut while the cylinder is returning and before knitting again begins, a take-up spring of the ordinary type is employed, over which the yarn at all times passes in going from the stop-off to the thread-guide. While the yarn is stopped off this spring yields to the pull of the thread-guide until the stroke is completed, and on the return-stroke retracts, thus taking up the slack until the yarn is released and knitting begins.

As the stop-off is only required during the reciprocating knitting, means are provided for stopping the reciprocation of the first or acting plate while tubular knitting is progressing. In our present machine we have provided also for the introduction of a second thread at any time during the formation of the stocking. Since this thread is kept entirely separate from the first until both pass beyond the stop-off, and since (whether it be used in combination with the first as a thickening-thread or be different in weight or color and be used in place of the first which is cut) in reciprocating knitting this thread must be acted upon by the stop-off exactly as is the first, the number of plates and take-up springs above described is doubled, though both sets are moved by the same actuating mechanisms.

As shown in Figs. 40 and 55, Sheets 11 and 13, the spur and miter gear $v^{10}$, which, as previously described, makes one-half as many revolutions as the cam-cylinder makes reciprocating movements, revolves the miter-gear marked 1, which is keyed to and revolves the short vertical shaft 2, on the upper end of which is keyed the miter-gear 3, which revolves the miter-gear 4, which is keyed to and revolves the short horizontal shaft 5, on the front end of which is keyed the eccentric 6, which actuates the driving-plates of the stop-off. Gears 1, 3, and 4 are all of the same size, their diameter being one-half that of gear $v^{10}$; hence it is evident that the eccentric 6 will make one revolution for each movement of the cam-cylinder $m'$. From the standard 7, which is secured to the table $d^9$, the arms 8, 9, and 10 project, said arms containing, as shown, suitable fixed bearings for the shafts 2 and 5. The eccentric 6, through the strap and rod 11, gives a reciprocating movement to the slotted arm 12, to which rod 11 is pivotally joined. The slotted arm, as shown in Figs. 40 and 41, is pivotally joined to the raising-rod 13 by a crow-foot lug 14, fixed to arm 12 at a point in line with the pin 15 of the driving-rod 16, which pin is pivotally joined to a block (not shown) fitting in the slot of arm 12, and so shaped as to permit said arm to be readily moved to and fro thereon. The slot of arm 12 being described from the center of shaft 5, and the pin 17, uniting it with raising-rod 13, being so located, when the parts are in the position shown in Fig. 40, as to be directly opposite the center of pin 15, and also opposite the center of that pin's reciprocating stroke, it will be seen that the eccentric 6, which rotates continuously, will, when the parts are in said position, rock the arm 12 idly on pin 15 as a center, giving no motion to rod 16; but when the raising-rod 13 is elevated, carrying arm 12 with it until rod 11 is in line with rod 16, it will be evident that a reciprocating motion will be given rod 16 equal in length to twice the eccentricity of eccentric 6.

On rod 16 are threaded, as shown in Fig. 41, the acting plates 18 and 19 of the double stop-off mechanism, which at the proper time strike the spring-pressed plates 20 and 21 and check the supply of yarn. The plates 20 and 21 are placed at the same distance apart as are plates 18 and 19, and are rigidly tied together by the guide-bolts 22, 23, and 24, screwed into lugs on plate 20 and fastened by small screws to similar lugs on plate 21. The guide-bolts pass loosely through similar lugs on the adjusting-plate 25, which is reciprocated horizontally by the oscillation of the screw-shaft 26, the plate being kept from turning with the shaft by the guide-bolts 27 27, screwed into the stationary boss 28, and passing loosely through the adjusting-plate 25.

From the foregoing it will be evident that as plate 25 cannot turn, and as the bolts 22, 23, and 24 make a sliding connection between it and plates 20 and 21, these plates also can have no rotary motion. Plate 20 is guided centrally by the rod 16, which passes through it, said rod entering also the extended hub of plate 21, into which hub the shaft 26 enters as an additional guide. Between plates 21 and 25 is placed the spiral spring 29, which tends to keep plate 21, and consequently plate 20, as far from plate 25 as the heads of the screw-bolts 22, 23, and 24 will permit. The distance of plate 25 from boss 28 is regulated by the crank 30, keyed to shaft 26, which crank is oscillated by the connecting-rod 31, Fig. 40, the crank 32, keyed to a short shaft 33, supported in a bearing secured to table $d^9$, the crank 34, also keyed to shaft 33, the connecting-rod 35, Fig. 55, the crank 36, keyed to a short shaft 37, supported in a bearing from the table, the crank 38, also keyed to said shaft, and the eccentric-rod 39 of the eccentric $m^{11}$, Fig. 29, Sheet 9, keyed to shaft K.

The eccentric 6 is so set on the shaft 5 that when the rod 13 and arm 12 are raised in reciprocating knitting the reciprocation of the plates 18 and 19 toward and from the plates 20 and 21 begins when the center of cam $d^4$, Fig. 38, Sheet 10, is at or about the center of the back or operative half of the needles and ends when cam $d^4$ returns to or near the same point.

Since in heel and toe knitting only about one-half of the needles are at the most in operation, it follows that the latest point of stopping off of the yarn will be when one-half the needles are in operation and just after the thread-guide has completed one-fourth of its reciprocating movement—i. e., when plates 18 and 19 have moved half of their stroke to the right—and that the earliest point of release will be when, in the same movement of the cam-cylinder, the thread-guide has completed three-fourths of its reciprocating movement—i. e., when plates 18 and 19 have completed half of their return-stroke to the left; also, that the earliest point of stopping off the yarn will occur (while the narrowest course of the heel or toe pouch is being knit and only about one-sixth of the total number of needles is in operation) when the thread-guide has passed through one-twelfth of its reciprocating movement—i. e., when plates 18 and 19 have completed one-sixth of their stroke to the right—and that the latest point of release will be when, in the same movement of the cam-cylinder, the thread-guide has completed eleven-twelfths of its reciprocating movement—i. e., when plates 18 and 19 have passed through five-sixths of their return-stroke to the left.

It is evident that in the first case above cited, (that of latest stopping off when the widest course of the heel or toe is being knit,) if the adjusting-plate 25 be so set that the plates 18 and 19 shall meet the plates 20 and 21 when the former plates have passed through one-half of their stroke toward the right, the yarn-supply will be checked at once and the plates 20 and 21 will be carried by the plates 18 and 19 toward the right, compressing the spring 29 and forcing the guide-bolts 22, 23, and 24 through their sockets in plate 25, and also on the return-stroke of the acting plates that the spring 29 will force the plates 20 and 21 against the acting plates until the latter plates have completed one-half of said return-stroke, when the heads of bolts 22, 23, and 24 will bring up against the lugs on plate 25, hold the plates 20 and 21, and release the yarn. The action in the second case cited (that of earliest stopping off and latest release of the yarn when the narrowest course of the heel or toe is being knit) is precisely the same, except that the adjusting-plate 25 must be so set that the acting plates shall meet the spring-pressed plates when the former have passed through one-sixth of their stroke to the right. The plates will then travel together until the acting plates have completed five-sixths of their stroke to the left, when the heads of bolts 22, 23, and 24 will bring up on the adjusting-plate 25, the plates 20 and 21 will be held, and the yarn released. In order, then, during reciprocating knitting to stop off and release the yarn at points in the movement of the thread-guide whose position depends on the number of needles in operation, it is evident (in passing from the widest to the narrowest and back again to the widest course of the heel or toe pouch) that the adjusting-plate 25 must be gradually moved from the position shown in Fig. 40, at half-stroke of the plates 18 and 19, toward the left to a point coinciding with the sixth part of said stroke and then back to the former position—i. e., plate 25 must complete one reciprocation between these limits while the pouch is being knit. This movement of the plate is effected through the connections previously enumerated by the eccentric $m^{11}$, Fig. 29, Sheet 9, keyed to shaft K, which oscillates the shaft 26 through one semi-rotary (more or less) reciprocation during that time, the pitch of the thread on shaft 26 being so proportioned as to give the proper movement to plate 25 for each step-by-step movement of shaft K.

From Figs. 40 and 41, which show the position of the parts during circular knitting, it will be seen that the plates during that time, and consequently at the beginning and end of reciprocating knitting, are sufficiently separated to permit the passage of the yarn without frictional tension, and that therefore the stopping off of the yarn will be a little later and the release a little earlier throughout reciprocating knitting than the number of needles in use would require. The discrepancy, however, is so slight as to prove rather an advantage than otherwise in preventing the stopping off from occurring too suddenly after the last needle is passed. As shown in Figs. 41 and 55, the main and additional threads are led from the bobbins through the eyes 40 40, beneath the rod 16, over the take-up springs 41 41, back over the guide-bolts 22 23, through the double eyes 42, and thence to the thread-changing plates, to be hereinafter described. When the yarn is clamped between the stop-off plates, the take-up springs 41 41 are drawn forward while the cam-cylinder is completing its stroke, and begin to retract as soon as the return-stroke commences, thus always keeping the yarn taut. The boss 28 is carried by the framework 43, which is suitably secured by sockets to the standards 44 and 45, fixed to the table $d^9$. The frame 43 also supports the bearing 46 for rod 16, the cross-bearing 47 for the take-up springs 41 41, and carries the rod 48, in which the eyes 40 40 are set. As previously stated, the acting plates of the stop-off are thrown out of gear by lowering the arm 12 to the position shown in Fig. 40. The arm is raised and lowered by the rod 13, which moves in guide-sockets carried by arms 49 49, supported by standard 44. The reciprocating movements of rod 13 are effected primarily through the semi-revolution of change-shaft D, which just previous to and just subsequent to reciprocating knitting acts on said rod through the oscillation of shaft $r^3$, as previously described, the oscillation of the latter shaft being communicated to the short shaft $h^8$, suitably supported from and beneath the table $d^9$ by the crank $e^8$, fixed to shaft $r^3$, the connecting-rod $f^8$, and the crank $g^8$. The motion of shaft $h^8$ is transmitted to rod 13 by the eccentric $k^8$, the strap of which is pivotally joined to said rod. The several parts throughout are so proportioned and set that one semi-revolution of the change-shaft D raises rod 13 the proper distance, and that the succeeding semi-revolution of said shaft reverses this action.

A thread-changing mechanism is shown in Figs. 5 and 6, Sheet 4, Fig. 40, Sheet 11, Figs. 42 to 54, inclusive, Sheet 12, and Fig. 55, Sheet 13. It is, in principle and design, based upon the well-known fact that if the loose end of a thread from a separate bobbin be brought in contact with a second thread which is being rapidly fed to the thread-guide in knitting, the adherence of the fibers of the threads will be sufficient to enable the second thread to pick up the first and carry it through the thread-guide and to the needles, after which knitting with the doubled thread will progress until one of the two threads is severed. As shown in Figs. 46 to 50, inclusive, Sheet 12, the mechanism consists, essentially, of two fixed clamping-plates 50 and 51, between which reciprocates a movable clamping-plate 52, (which is made capable of clamping either of the threads 53 or 54 which pass between it and plates 50 and 51, respectively,) and a parting-bar 55, which separates the threads, said bar forming a sheath for a cutting-knife 56, which is pivotally joined to it, and is capable, when required, of vibration in either direction and sufficiently far outside of bar 55 to cut either of the threads 53 or 54.

As shown in Figs. 46 and 55, the threads are led from the yarn stop-off over the take-up springs 41, through the double eye 42 on each side of the movable plate 52, and between it and the clamping-plates 50 and 51, outside of the parting-bar 55, through the web-holder spindle $e^{11}$, (which is hollow, as described in the application and patent previously referred to, to which reference may be had,) and thence to the thread-guide $g^4$. In the position shown in Fig. 46 the main thread 53 is being fed and the additional thread 54 has been cut sufficiently far below the parting-bar 55 to permit the main thread (in the diverging rotary motion given it by the revolution of the aperture 57, Fig. 55) of the spindle $e^{11}$ to wind the loose end of the additional thread 54 about the said main thread 53. The additional thread is also clamped between the plates 52 and 51.

The operation of the mechanism in replacing the main with the additional thread is shown in Figs. 46 to 50, inclusive. As will be hereinafter explained, this is effected during one revolution or one reciprocating movement of the cam-cylinder. At the beginning of said revolution or movement the movable plate 52 is suddenly shifted to its central position, which, as shown in Fig. 47, releases the additional thread 54, the latter being at once carried by the main thread to the thread-guide. At the same time the parting-bar 55 begins to move gradually downward, separating the threads, until just before the close of the revolution or movement of the cam-cylinder it reaches the lower limit of its stroke, as shown in Fig. 49. At this point the clamping-plate 52 is suddenly moved to the left, clamping the main thread, and simultaneously the knife 56 emerges from the left side of its sheath in bar 55, thus presenting a sharp edge to thread 53, on which the pull of the thread-guide severs it. Immediately afterward, as shown in Fig. 50, the knife is sheathed and the parting-bar instantaneously ascends to the upper limit of its stroke, leaving the additional thread feeding and the main thread clamped and cut. The loose end of the latter is almost instantaneously wrapped around the additional thread, ready for the reversal of the operation.

In replacing the additional with the main thread, which is also performed during one revolution of the cam-cylinder, the various operations are exactly as above described, excepting that the movable plate 52 moves sharply to the right from its central position and the knife 56 emerges from the right-hand side of its sheath, thus cutting and clamping the additional and leaving the main thread free.

As shown in Fig. 40, plate 50 is threaded on bolt 58, which bolt also acts as a guide-rod for plate 52, being reduced in diameter to pass through said plate and enter the hollow body of a bolt 59 of the same external diameter, on which plate 51 is threaded. Both bolts pass loosely through and are supported by the bosses 60 60, carried by the frame 61, Fig. 42, which is supported by standards 44 and 45. Between the bosses 60 60 and the plates 50 and 51 the cushioning-springs 62 62 are interposed, which permit a slight backward movement of the plates 50 and 51 should the plate 52 be moved too far in either direction. Through bosses 99, made in the arms of frame 61, the screw-shaft 63 passes and is supported, on which shaft is threaded the hub 64, which is rigidly connected with the movable plate 52 by a small arm, and by the reciprocation of which to and fro on the shaft 63 said plate is vibrated. Inasmuch as bolt 58 passes through plate 52, it is evident that hub 64 cannot turn with shaft 63 and must reciprocate when said shaft is oscillated. Frame 61 also carries a standard 65, which supports an arm terminating in the double eye 42. The oscillation of shaft 63 is, when required, effected through the crank 66, secured to said shaft, the link 67, the bell-crank 68, Fig. 55, pivoted to frame 61, the link 69, and the lever 70, pivoted at 71 on socket-frame 72, carried by standards 44 and 45. A projection 73, extending downward from the lever 70 and provided with an anti-friction roller, bears on the cam 74, Fig. 55, keyed to shaft 75, Fig. 5, Sheet 4, by the movement of which the shaft 63 is oscillated and plate 52 reciprocated.

The parting-bar 55, as shown in Figs. 43, 46, and 55, consists of an upper and a lower part bolted together by the screws 76 and 77, and having a space between them which forms the sheath for the two-edged knife 56. The front portions of both parts of the bar are made V-shaped in section to facilitate the separation of the threads. The bar is pivoted at 78 in the center of the socket-frame 79, carried by standards 44 and 45, and its rear end is oscillated by the link 80 and lever 81, pivoted at 82 on a bearing carried between the two parts of the socket-frame 72. A downward projection 83 from the lever 81, provided with an anti-friction roller, bears on the cam 84, Fig. 54, keyed to shaft 75, by the movement of which the bar 55 is vibrated.

The cutting-knife 56, Figs. 44 and 55, as previously stated, is two-edged, that it may cut either thread. It is pivoted on the screw-bolt 77, and is sheathed, when in inoperative position, in the space between the upper and lower parts of the bar 55. The knife tends always to assume a central or sheathed position within the bar, owing to the lateral pressure of the double spring 85, Fig. 45, which is secured to the upper part of the bar and bears on the sides of the knife. The rear end of the body of the knife is extended laterally to project over the lower part of the bar, which projection, when the bar descends and at the moment when the thread is to be cut, strikes one of the interior sides of the V-shaped cam 86, Figs. 40 and 55.

Cam 86 is secured to the top of lever 87, said lever being pivoted at 88 on a stud-bearing fixed to socket-frame 72, and having on its lower arm an inturned projection 89, the point of which bears in the cam-path of cam 90, Fig. 53, keyed to shaft 75, by the rotation of which said lever and cam 86 are vibrated. The lever 87 is guided in its oscillations by the finger 91, secured to said lever, as shown, which guide-finger bears on a curved flanged guideway carried by the socket-frame 92, said frame being supported by standards 44 and 45.

It is evident that the inclination from the vertical of the lever 87 will determine which of the interior faces of cam 86 is to strike the rear projecting end of knife 56, and consequently the side of the parting-bar on which its cutting-edge shall be unsheathed; for if the upper arm of lever 87 be inclined toward the right the left interior face of cam 86 will strike and force toward the center of the bar the left side of the projecting end of the knife, thus throwing outward from the center the left-hand cutting-edge, as shown in Fig. 49. Conversely, if lever 87 be inclined toward the left, the right-hand cutting-edge will be unsheathed. Cam 86 is so proportioned internally that contact with the knife 56 shall not occur until bar 55 reaches the end of its stroke, and that therefore as soon as the bar begins to ascend contact will cease and the spring 85 will force the knife into its sheath.

As previously stated, the introduction of the additional thread and the severing of the main thread are effected during one revolution or movement of the cam-cylinder and the replacing of the main thread and the removal of the additional thread are effected during some subsequent revolution of said cylinder. Since the latter operation differs from the former, in that cams 74 and 90 actuate their connected mechanisms differently during each of the said operations, it follows, if such rotating cams are to be used, that the acting surfaces of said cams must be so formed as to effect one of the operations specified in a part of the revolution of the cams and the other operation in some succeeding part of said revolution.

For convenience we have so formed the cams as to perform the first series of operations in one semi-revolution and the second series in the succeeding semi-revolution, and have keyed the cams upon a shaft which makes but one-half as many revolutions as the cam-cylinder, and which can be intermittently revolved, a semi-revolution at a time. To effect this the shaft 75, Fig. 5, to which cams 74, 84, and 90 are keyed, and which is suitably supported from the table $d^9$, is set in alignment with the shaft $u^{10}$, which, as previously stated, makes one-half as many revolutions as the cam-cylinder, being, however, separated from said shaft by the short intermediate shaft $n^{11}$, which is supported by the bearing $o^{11}$, the latter being capable of reciprocation in the guideway $p^{11}$ by the rod $q^{11}$, attached to bearing $o^{11}$, Figs. 5, 6, and 51, guided at $r^{11}$, and pressed by the spring $s^{11}$ against the pattern-chain $t^{11}$, said pattern-chain being driven by a drum keyed to shaft $u^{11}$, the latter being suitably supported from the table $d^9$. The shaft $u^{11}$ is rotated by the eccentric $v^{11}$, keyed to shaft $u^{10}$, and acting through the strap and rod $w^{11}$, the crank $x^{11}$, mounted loosely on shaft $u^{11}$, and the pawl $y^{11}$, pivotally attached to the crank $x^{11}$, which drives the ratchet $z^{11}$, keyed to shaft $u^{11}$.

While the center of the shaft $n^{11}$ is in the same horizontal plane as the centers of the shafts $u^{10}$ and 75, it is never in alignment vertically with said centers, but whether at one end or the other of its horizontal reciprocation it is always eccentrically placed with regard to them. Its reciprocating stroke, however, would be equally divided by a line joining the said centers. On the shaft 75 is keyed the crank $a^{12}$, which is in sliding connection with the slotted crank $b^{12}$, keyed to shaft $n^{11}$, through the pin or bolt $c^{12}$, which is made fast to crank $a^{12}$, and is capable of sliding in the slot of crank $b^{12}$. There is also keyed on the shaft $n^{11}$ the crank $d^{12}$, which has a projecting lug $e^{12}$, so shaped as to be capable of engaging a similar lug $f^{12}$, projecting from the crank $g^{12}$, keyed to shaft $u^{10}$. The lugs $e^{12}$ and $f^{12}$ are of the same radial length. The radial distance from the center of shaft $n^{11}$ to the outer extremity of lug $e^{12}$ is less than the corresponding distance from the center of shaft $u^{10}$ to the outer extremity of lug $f^{12}$ by one-half the radial length of either lug, and the sliding bearing of shaft $n^{11}$ is capable of being moved in the guideway $p^{11}$ a distance equal to the radial length of either lug, which distance is so spaced as to be equally divided by an imaginary line joining the centers of the shafts $u^{10}$ and 75.

From the construction described it will be seen that if the bearing $o^{11}$, with shaft $n^{11}$, be forced to one end or the other of its reciprocating stroke the crank $g^{12}$, which revolves continuously, will, during its revolution, bring the lug $f^{12}$ into engagement with lug $e^{12}$ and revolve shaft $n^{11}$ through one semi-revolution, at which time lug $f^{12}$ (which has, owing to the eccentricity of shaft $n^{11}$, been gradually disengaging itself from lug $e^{12}$) will be fully disengaged from lug $e^{12}$, will pass outside of said lug, and will, during succeeding revolutions, leave it untouched until the shaft $n^{11}$ is moved to the other end of its stroke, when another semi-revolution of shaft $n^{11}$ will in the same manner be made. The shaft 75 moves, with the shaft $n^{11}$, through the connections previously described, the slot in crank $b^{12}$ being so proportioned as to admit of the horizontal movement of the pin $c^{12}$ in said slot when the bearing is reciprocated. The bearings of the shaft 75 are "set up" tightly, that the friction between them and the shaft may prevent the latter from being carried too far forward by the momentum of the moving parts.

By varying the eccentricity of the shaft $n^{11}$, and also the effective length of the crank or arm $d^{12}$, the shaft $u^{10}$ can be made to move the shaft $n^{11}$ through any required portion of a semi-revolution. It will also be seen that the slotted crank $b^{12}$ and the crank $a^{12}$ are interchangeable with regard to their respective shafts, as is also the case with the movable and fixed projecting blocks on the arms $d^7$ and $p^7$, Fig. 16, either of which arms can carry the movable block provided the other carries a fixed block.

From Figs. 46, 47, 49, and 55 it will be seen that at the beginning of either semi-revolution of shaft 75 the movable plate 52 must be at one extreme or the other of its reciprocation, and that therefore the lever 70 must be either raised or lowered, and also that as soon as the semi-revolution begins the plate must pass to and remain at its mid-position until the close of said semi-revolution, and therefore that the lever 70 must, during that time, remain at mid-throw. Cam 74, Fig. 52, is therefore provided with an elevation 100, a depression 101 one hundred and eighty degrees from said elevation, and concentric paths joining the two, the elevations and depressions being just large enough to contain the roller end of the projection 73 on lever 70. It will also be seen that the parting-bar 55 must be at the upper limit of its stroke at the beginning of a semi-revolution, must descend gradually to the lower limit of said stroke, and must then be suddenly elevated to its first position, and that, consequently, the lever 81 must, at the beginning of the semi-revolution, be down, must ascend gradually, and at the end of said semi-revolution must suddenly descend again. Cam 84, Fig. 54, has therefore two low points one hundred and eighty degrees apart and equally distant from the center, with spiral paths between and approximately radial lines joining the high and low parts of the path. It will also be seen that the knife 56 must during one semi-revolution vibrate to the left and during the other semi-revolution to the right of the center line. Cam 90, Fig. 53, is therefore provided with a straight path, except at two points one hundred and eighty degrees apart, where the path diverges respectively to the left and right.

It is evident that slight changes in the mechanisms described will fit them for inserting the additional thread as a thickening-thread merely, as is often customary in re-enforcing the heel and toe pouches. From Figs. 46 to 50, inclusive, it will be seen that in the first semi-revolution all that is necessary to be done is to move the plate 52 to the central position, which action will be reversed at the end of the second semi-revolution of shaft 75; hence cam 74 should be provided with but one small elevation or depression, (depending on direction of screw-thread on shaft 63,) the remainder of its path being concentric. During the first semi-revolution the parting-bar 55 will not move at all, and during the second it will gradually fall until the end, when it will suddenly rise; hence cam 84 should be provided with a concentric path for one hundred and eighty degrees of its circumference, which path should then gradually rise until about the end of the second one hundred and eighty degrees of its circumference, when it should suddenly fall to its former level.

If two main threads be used with separate stop-offs and changing-plates, it is evident that two additional threads can be inserted by using the main threads as carriers.

Other modifications which do not depart from the spirit of this invention will readily suggest themselves.

Having thus described our invention, we claim as new—

1. The combination, with the cam-cylinder, of the driving-shaft A, a double clutch thereon, gearing whereby the cam-cylinder may be operated from each of the loose members of said clutch, a rotating cam, means for rotating the same, and devices for controlling the rotation thereof, whereby it may be left at rest or given a movement of rotation at desired intervals, and a connection between said cam and the engaging member of the clutch, whereby the desired loose member may be locked to the driving-shaft for operation therewith.

2. The combination, with the cam-cylinder, of the main power-shaft A, a double clutch thereon, gearing whereby the cam-cylinder may be operated from each of the loose members of said clutch, a shaft F, means for rotating the same, devices for controlling the rotation of said shaft, whereby it may be left at rest or given a movement of rotation at the desired times, a cam $q'$ on shaft F, and a connection between said cam and the engaging member of the clutch, whereby the desired loose member may be locked to the shaft A for operation therewith.

3. The combination, with the cam-cylinder, of the main power-shaft A, a double clutch thereon, gearing whereby the cam-cylinder may be operated from each of the loose members of said clutch, a rotating shaft F, carrying a cam $q'$, a connection between the said cam and the engaging member of the clutch for operating the said engaging member, a ratchet on shaft F, a pawl, means for operating said pawl from shaft A, and means for throwing said pawl into and out of engagement with said ratchet.

4. The combination of two shafts, each carrying a gear-wheel, one of said gears being loose on its shaft, an intermediate gear-wheel for revolving said gears in unison, a crank of fixed length on one shaft, a crank of variable length on the other shaft, a clutch for making the loose gear fast on its shaft, a connection between the two cranks, the cam-cylinder, and gearing for driving the same from one of said shafts, substantially as shown and described.

5. The combination, with the driving-shaft A, provided with two loose gears of unequal sizes, and with a double clutch mechanism, by which either of said gears is made fast, of a driven shaft B, provided with gears of unequal sizes which are in mesh with the gears of shaft A, a shaft C, the cam-cylinder and gearing to drive the same from shaft C, the latter carrying a loose gear which is in mesh with one of the gears of shaft A, and a clutch by which said gear is made fast, a crank-connection between the shafts B and C, the crank of the latter being variable in length, and devices in connection with the variable crank and the clutch of shaft C, whereby the crank is lengthened and the clutch thrown out of gear simultaneously, or vice versa, substantially as shown and described.

6. The combination, with shaft B, having a driving-gear $k$, the shaft C, having a loose gear $p$ and a clutch by which said gear is made fast, and the cam-cylinder and gearing to drive the same from shaft C, of an intermediate gear between the gears $k$ $p$ for imparting motion from one to the other, a crank-connection between the shafts B C, the crank of the latter being variable in length, and devices in connection with the said clutch and the variable crank, whereby the crank is lengthened and the clutch thrown out of action, and vice versa, substantially as shown and described.

7. The combination, with the cam-cylinder, of two shafts, gearing whereby the cam-cylinder is driven from one of the said shafts, a crank of fixed length on one of said shafts, and a crank of variable length on the other, a connection between the two cranks, a clutch on one of said shafts, a connection between said clutch and the other of said shafts, whereby when the clutch is in engagement the two shafts will be caused to move in unison, and a connection between the said variable crank and the clutch, whereby the effective length of the variable crank is changed and simultaneously therewith the clutch is made fast to or disengaged from its shaft, substantially as shown and described.

8. The combination, with the cam-cylinder, of two shafts, gearing whereby the cam-cylinder is driven from one of said shafts, a crank of fixed length on one of said shafts, and a crank of variable length on the other, a connection between the two cranks, a clutch on one of said shafts, a connection between said clutch and the other of said shafts, and means for making said clutch fast to or disengaging it from its shaft and for changing the effective length of said variable crank, substantially as shown and described.

9. The combination, with the knitting devices and controlling mechanism for effecting the changes from continuous rotary knitting to reciprocating knitting and back again, and determining the action of the knitting devices before and after such changes, of two rotating shafts, one of which is in connection with such controlling mechanism, a fixed crank-arm on the other of said shafts, the first shaft having thereon a loose crank-arm and a fixed ratchet, a pawl carried by said loose crank-arm in engagement with said ratchet, lugs on the said crank-arms projecting toward and into the path of rotation of each other, and a device for moving one of said lugs out of the path of rotation of the other as the two arms are moving in unison, substantially as shown and described.

10. The combination, with the knitting devices and controlling mechanism for effecting the changes from continuous rotary knitting to reciprocating knitting and back again, and determining the action of the knitting devices before and after such changes, of two rotating shafts, one of which is in connection with such controlling mechanism, a fixed crank-arm on the other of said shafts, the first shaft having thereon a loose crank-arm and two fixed ratchet-wheels, of which one is reversed with respect to the other, a pawl on said loose arm in engagement with one of said ratchet-wheels, a retaining-hook on said arm in engagement with the other ratchet-wheel, lugs on the said crank-arms projecting toward and into the path of rotation of each other, a device for moving one of said lugs out of the path of rotation of the other as the two arms are moving in unison, and a tripping device for tripping the retaining-hook to permit a backward movement of the loose crank-arm, as shown and described.

11. The combination, with the knitting devices and controlling mechanism for determining the action thereof, of two rotating shafts in axial alignment, one of which is connected with such controlling mechanism, and each having a crank-arm with a lug which projects toward and into the path of rotation of the other, the lug on one of said arms being movable, and a tripping device for moving said movable lug to disengage it from the lug of the opposite arm at a predetermined point, substantially as shown and described.

12. The combination, with the needles, needle-cylinder, cam-cylinder, a main shaft, means for imparting to the cam-cylinder from the main shaft either a continuous rotary motion or a reciprocating motion, as desired, means for placing *en masse* a portion of the needles into or out of operative position, pattern devices for successively throwing out of and into operation a portion of the remaining needles to effect narrowing and widening, and devices for changing the motion of the cam-cylinder from continuous rotary motion to reciprocating motion, and vice versa, of the shaft D, means whereby an intermittent motion is communicated to said shaft D from shaft A, and connections whereby said shaft D throws into and out of operation the motion-changing devices, the pattern devices, and the said means for placing the needles *en masse* into or out of operative position, substantially as shown and described.

13. The combination, with the needles, needle-cylinder, cam-cylinder, means for giving to said cam-cylinder either a continuous rotary motion or a reciprocating motion, means for placing *en masse* a portion of the needles in or out of operative position, pattern devices for successively throwing out of and into operation a portion of the remaining needles for narrowing and widening, and devices for changing the motion of the cam-cylinder from continuous rotary motion to reciprocating motion, and vice versa, of the shaft D and connections whereby said shaft D throws into and out of operation the motion-changing devices, the pattern devices, and the means for placing a portion of the needles *en masse* in or out of operative position, substantially as shown and described.

14. The combination, with the needles, needle-cylinder, cam-cylinder, devices for driving said cam-cylinder, embracing a crank of variable radius, whereby either a continuous rotary motion or a reciprocating motion may be communicated to the cam-cylinder, according to the adjustment of the crank, means for placing in inoperative position a portion of the needles *en masse*, devices whereby the adjustment of the variable crank may be effected, and a yarn stop-off for gripping the yarn after the passage of the yarn-guide by the last of the needles in operation during each of the movements of the cam-cylinder while reciprocating, of a shaft D and connections whereby a movement of said shaft will effect the adjustment of the variable crank and change the motion of the cam-cylinder from continuous rotary to reciprocating, cause the needle-raising means to elevate the needles in connection therewith, and throw into operation the yarn stop-off, substantially as shown and described.

15. The combination, with the needles, needle-cylinder, cam-cylinder, devices for driving said cam-cylinder, embracing a crank of variable radius, whereby either a continuous rotary motion or a reciprocating rotary motion may be communicated to the cam-cylinder, according to the adjustment of the crank, means for placing in operative position *en masse* a portion of the needles that have been raised, devices whereby the adjustment of the variable crank may be effected, and a yarn stop-off for gripping the yarn after the passage of the yarn-guide by the last of the needles in operation during each of the movements of the cam-cylinder while reciprocating, of a shaft D and connections whereby a movement of said shaft will effect the adjustment of the variable crank and change the motion of the cam-cylinder from rotary reciprocating to continuous rotary, cause the needle-lowering means to lower the needles in connection therewith, and throw out of operation the yarn stop-off, substantially as shown and described.

16. The combination, with the needles, needle-cylinder, cam-cylinder, devices for driving said cam-cylinder, embracing a crank of variable radius, whereby either a continuous rotary motion or a reciprocating rotary motion may be communicated to the cam-cylinder, according to the adjustment of the crank, means for placing into and out of operative position a portion of the needles *en masse*, devices whereby the adjustment of the variable crank may be effected, and a yarn stop-off for gripping the yarn after the passage of the yarn-guide by the last of the needles in operation during each of the movements of the cam-cylinder while reciprocating, of a shaft D and connections whereby a movement of said shaft will effect the adjustment of the variable crank and change the motion of the cam-cylinder from continuous rotary motion to reciprocating rotary motion, or vice versa, cause the needle raising and lowering means to raise or lower the needles in connection therewith, and throw into or out of operation the yarn stop-off, substantially as shown and described.

17. The combination, with the jack-holder and with the jacks and needles controlled thereby, of an intermittently rotating or oscillating shaft and an eccentric thereon, and a connection between the said eccentric and jack-holder, whereby the needles controlled by said jack-holder are raised out of or lowered into operative position by a partial rotation of said shaft, substantially as shown and described.

18. The combination, with the needle-cylinder and needles, the jacks $k^3$, and mechanisms for operating the same, and with the main power-shaft A, of the shaft K, carrying actuating-cams, an escapement-wheel driving the said shaft, an escapement-lever, a pawl-and-ratchet mechanism, and spring-connections intermediate the said ratchet and escapement-wheel, and connections intermediate the said shaft A and said pawl and escapement-lever, whereby reciprocating motion is imparted to the said pawl and slide, substantially as described.

19. The combination, with the needle-cylinder, of two eccentrics, either of which may be brought into action to raise and lower the cylinder during each revolution or forward and backward reciprocation of such cam, a link, the driving-rods of said eccentrics connected to opposite ends of said link, a sliding connection between said link and cylinder, and a cam $c^{10}$, and connections intermediate said link and cam for reciprocating said link, whereby the times of the upward and downward movements of the cylinder may be changed and the limits of its reciprocation raised or lowered without affecting the stroke of said cylinder, substantially as described.

20. The combination, with the vertically-reciprocating web-holder and with the oscillating or intermittently-rotating shaft D, provided with a cam $v^3$, of intermediate connections whereby the web-holder is raised out of and lowered into operative position by an oscillation or semi-rotation of shaft D, substantially as shown and described.

21. The cam-cylinder provided with the fixed upper and lower needle-actuating cams and having the movable switch-cams $b^4 c^4$ applied thereto, in combination with the annular gear $l'$, having a rigid connection with the switch-cams $b^4 c^4$, the said gear and switch-cams moving together to change the cam-path, and a thread-guide connected with the annular gear or with the said switch-cams, so as to have an independent motion relatively to the cam-cylinder, substantially as shown and described.

22. The combination, with the cam-cylinder and the switch-cams and their rigidly-attached yoke, the yoke being so connected as to have a slight independent movement relatively to the cam-cylinder, of a thread-guide attached to the yoke, substantially as shown and described.

23. The combination, with the needle-cylinder and needles, the jacks $k^3$, the cam-bars, and devices for operating the jacks from said cam-bars, of the shaft K, with helical cams, an escapement-wheel keyed to said shaft, a pawl-and-ratchet mechanism, and intermediate spring-connections between the ratchet and escapement-wheel, and an oscillating shaft L, having operative connection with the pawl-lever and with the fork of the escapement-wheel, substantially as shown and described.

24. The combination, with the needle-cylinder and needles, of a series of jacks for raising the needles out of and lowering them into action, a series of compound levers connected with the jacks to operate the latter, a reciprocating cam and connections between said cam and levers, a helical spring-actuated cam to move the said reciprocating cam, and an escapement to control the helical cam, substantially as and for the purpose described.

25. The combination, with the needle-cylinder and needles, of a series of jacks for raising and lowering the needles, a series of compound levers connected with the jacks to operate the latter, and a reciprocating cam and connections between said cam and levers, substantially as and for the purpose described.

26. The combination, with the cam and needle-cylinders and with the needles and jacks, of levers for moving the jacks and needles, reciprocating cam-bars for producing the required movement of the levers at predetermined times, and cams for reciprocating said cam-bars, substantially as shown and described.

27. The combination, with the cam and needle-cylinders and with the needles and jacks, of levers for moving the jacks and needles, reciprocating cam-bars for producing the required movements of the levers at predetermined times, rotating spring-pressed cams for reciprocating said cam-bars, and an escapement to control the action of the cams.

28. The combination, with a needle-cylinder, of means for raising said cylinder and lowering the same again during the knitting of each course in either continuous circular knitting or reciprocating knitting for the purpose of shaping the fabric by varying the lengths of the loops in the different parts of a course, substantially as shown and described.

29. The combination, with a needle-cylinder, of an eccentric, means for rotating the same, and connections intermediate said eccentric and cylinder, whereby the latter is raised and lowered during the knitting of each course for the purpose of shaping the fabric by varying the lengths of the loops in the different parts of a course, substantially as shown and described.

30. The combination, with a needle-cylinder, of an eccentric, means for rotating the same, and connections intermediate said eccentric and cylinder, whereby the latter is raised and lowered during the knitting of each course for the purpose of shaping the fabric by varying the lengths of the loops in the different parts of a course, said connections being adjustable, substantially as described, whereby the average length of the loops may be varied, as described.

31. The combination, with a needle-cylinder, of an eccentric, means for rotating the same, and connections intermediate the eccentric and the cylinder, whereby the latter is raised and lowered during the knitting of each course for the purpose of shaping the fabric by varying the lengths of the loops in the different parts of a course, said connections embracing a rod adjustable in the direction of its length, whereby the average length of the loops may be varied, as described.

32. The combination, with a needle-cylinder, of an eccentric, means for rotating the same, and connections intermediate the eccentric and the cylinder, whereby the latter is raised and lowered during the knitting of each course for the purpose of shaping the fabric by varying the lengths of the loops in the different parts of a course, said connections embracing a rod $o^9$, made in two parts and connected by a right and left hand coupling, and means for rotating said coupling to lengthen and shorten the rod $o^9$, substantially as shown and described.

33. The combination, with a needle-cylinder, of an eccentric, means for rotating the same, and connections intermediate the eccentric and the cylinder, whereby the latter is raised and lowered during the knitting of each course for the purpose of shaping the fabric by varying the lengths of the loops in the different parts of a course, said connections embracing a rod $o^9$, made in two parts and connected by a right and left threaded coupling, a lever for turning said coupling to lengthen and shorten the rod $o^9$, and a cam for operating said lever, substantially as shown and described.

34. The combination, with the needle-cylinder, of two oppositely-arranged eccentrics $q^9$ $r^9$, the rods $s^9$ $t^9$, the link $p^9$, to the opposite ends of which said rods are connected, and connections intermediate said link and the cylinder for raising and lowering the latter, having a sliding connection with the link, substantially as shown and described.

35. The yarn stop-off for knitting-machines herein described, consisting of two clamping-plates, means for imparting to one of said plates a constant reciprocating stroke, a spring-seat for the other of said plates, and means whereby a reciprocating movement is imparted to the spring-seat, in order that the thread may be clamped and released at different points in the reciprocation of the two plates, substantially as shown and described.

36. The yarn stop-off for knitting-machines herein described, consisting of two clamping-plates, means for imparting to one of said plates a constant reciprocating stroke, and means whereby the other of said plates is changed in position, in order that the thread may be clamped at different points in the reciprocation of the two plates, substantially as shown and described.

37. The yarn stop-off for knitting-machines herein shown and described, consisting of a reciprocating rod 16, a clamping-plate mounted thereon, and means for imparting reciprocating motion to said rod, a second clamping-plate, a screw-shaft 26, with which the latter plate is connected, an eccentric $m^{11}$, and connections between the screw-shaft and eccentric, substantially as shown and described.

38. The combination, with the yarn stop-off, consisting of fixed and movable plates, and an eccentric for reciprocating the movable plates, of a movable link-connection between the said eccentric and plates, whereby the reciprocations of the latter may be varied, and whereby the yarn stop-off may be thrown entirely out of action, substantially as shown and described.

39. The combination, with the fixed and movable plates of the stop-off and the rod 16, of an eccentric for reciprocating said rod, and an intermediate link 12, pivotally joined at one end to the rod of the said eccentric, a vertically-movable rod 13, connected at its upper end with the opposite end of the link, and at its lower end with an eccentric $k^8$, the change-shaft D, with its eccentric $v^3$, and crank-connections between the eccentrics $k^8$ $v^3$, substantially as shown and described.

40. The combination, with the yarn stop-off, consisting of fixed and movable clamping-plates, the latter being carried by a reciprocating rod 16, and an eccentric for reciprocating said rod, of a link 12, pivotally joined at one end to the eccentric-rod and forming a connection between the latter and the rod 16, and a vertically-movable rod 13, connected with the opposite end of said link to shift the latter, substantially as shown and described.

41. A thread-inserting mechanism consisting, essentially, of two relatively fixed plates 50 51, and an intermediate clamping-plate 52, capable of being moved into contact with either of the plates 50 51 to clamp and stop off either of two threads, and which, when standing in a central position, allows both threads to be fed forward together, and devices for shifting said movable plate and for holding it in a central position, substantially as shown and described.

42. The thread-inserting mechanism consisting of plates 50 51, fixed relatively to each other, a movable plate 52 between the same, a screw for shifting said movable plate toward either of the fixed plates, and a cam and intermediate connections for imparting rotary movement to said screw.

43. A thread-inserting device comprising two relatively fixed plates 50 51 and an intermediate clamping-plate 52, capable of being moved into contact with either of the plates 50 51 to clamp either of two threads, and a cam and intermediate connections constructed to hold the clamping-plate first in a central position, and then to move it into contact with one or the other of the fixed plates, substantially as and for the purpose described.

44. The thread-inserting mechanism consisting of plates 50 51, fixed relatively to each other, a movable plate 52 between the same and capable of being moved into contact with either operating devices for said plate, a thread separator and cutter 55 56, and means, substantially as described, for moving the same between the threads and for placing the cutter in and out of position for acting upon one of the threads.

45. The parting-bar and separator consisting of a vibrating bar pivoted to a rigid frame and a vibrating knife pivotally attached to said bar, a cam and intermediate devices for vibrating said bar, and a cam for vibrating the knife, substantially as shown and described.

46. In a thread-changing mechanism, the combination of a series of clamping-plates adapted to clamp and stop off either of two threads which are being fed to the needles, a pivoted separating-bar, and a severing-knife pivoted on said bar, cams for operating the separating-bar and severing-knife, and connecting devices intermediate the separating-bar and its cam, substantially as shown and described.

47. A thread-inserting device comprising two relatively fixed plates 50 51 and an intermediate clamping-plate capable of being moved into contact with either of the plates 50 51 to clamp and stop off either of two threads, and which in a central position will allow both threads to be fed forward, and a cam and intermediate connections to operate said clamping-plate, in combination with a pivoted separating-bar carrying a pivoted knife to sever the thread, a cam to vibrate said knife, and a cam and intermediate devices for operating said separating-bar, substantially as shown and described.

48. The combination, with the clamping-plates 50 51 52 and the cam and intermediate connections for operating the plate 52, of a pivoted vertically-vibrating separating-bar, means for operating said bar, a double-edged knife pivotally joined to said bar and capable of being projected beyond the separating-bar on either side to sever either of two threads which are being fed forward, and a forked cam 86, capable of being moved laterally to project the knife from either side, substantially as shown and described.

49. The combination, with thread-changing devices and their actuating means, of two shafts, one of which is in operative connection with the said actuating means, the axes of the said shafts being in parallel lines, but normally out of axial alignment, each shaft being provided with a crank and each crank with a lug which projects into the plane of rotation of the lug of the other of said cranks, one of said shafts being movable into and out of alignment with the other, and a cam or pattern-chain for moving said shaft, substantially as shown and described.

50. The combination, with thread-changing devices, of two shafts in axial alignment, one connected with the source of power and the other with the said thread-changing devices for actuating the latter, of an intermediate shaft supported in movable bearings so as to be capable of movement into and out of axial alignment with the first-mentioned shafts, said intermediate shaft having a sliding crank connection with one of said shafts, and with the other an intermittent connection, which consists of a crank on each shaft and on each crank a pin which projects into the plane of rotation of the other pin, substantially as shown and described.

51. The combination, with thread-clamping plates and devices for operating the same, as described, of two shafts which normally are out of axial alignment with each other, each at adjacent ends being provided with a crank carrying a lug, the lug of each crank projecting into the path of rotation of the lug of the other, and means whereby the axis of one of said shafts is moved at desired intervals from one side to the other of the axis of the other shaft.

52. The combination, with thread-clamping plates and devices for operating the same, as described, of two shafts $u^{10}$ and $n^{11}$, whose axes are parallel, but normally out of alignment with each other, each at adjacent ends being provided with a crank carrying a lug, the lug of each crank projecting into the path of rotation of the other, one of said shafts being movable, and means whereby said movable shaft is moved into and out of axial alignment with the other of said shafts, whereby a continuous rotation of one shaft will impart an intermittent rotation to the other, substantially as shown and described.

In testimony whereof we affix our signatures in presence of two witnesses.

WILLIAM L. CATHCART.
ALEXANDER T. CATHCART.

Witnesses:
SAMUEL STILLÉ,
MARGARET STILLÉ.